US011080948B2

(12) United States Patent
Sundareswara et al.

(10) Patent No.: US 11,080,948 B2
(45) Date of Patent: *Aug. 3, 2021

(54) SYSTEM AND METHOD FOR AIRCRAFT FAULT DETECTION

(71) Applicant: The Boeing Company, Chicago, IL (US)

(72) Inventors: Rashmi Sundareswara, Topanga, CA (US); Tsai-Ching Lu, Thousand Oaks, CA (US); Franz D. Betz, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/853,887

(22) Filed: Apr. 21, 2020

(65) Prior Publication Data

US 2020/0250905 A1    Aug. 6, 2020

Related U.S. Application Data

(63) Continuation of application No. 15/714,253, filed on Sep. 25, 2017, now Pat. No. 10,657,736.

(51) Int. Cl.
*G05B 23/02* (2006.01)
*G06N 20/00* (2019.01)
(Continued)

(52) U.S. Cl.
CPC ......... *G07C 5/0808* (2013.01); *G05B 23/024* (2013.01); *G06N 5/04* (2013.01); *G06N 20/00* (2019.01); *G07C 5/085* (2013.01)

(58) Field of Classification Search
CPC .............. G07C 5/0808; G07C 23/024; G07C 23/0221; G07C 5/085; G06N 20/00; G06N 5/04
(Continued)

(56) References Cited

U.S. PATENT DOCUMENTS

| 4,213,175 A | 7/1980 | Kurihara |
| 4,943,919 A * | 7/1990 | Aslin ................... G07C 5/006 340/500 |

(Continued)

FOREIGN PATENT DOCUMENTS

DE    10332126    2/2005

OTHER PUBLICATIONS

Maxion, et al. "Anomaly Detection in Embedded Systems"; IEEE Transactions on Computers, vol. 51, No. 2, 2002, pp. 108-120.

(Continued)

*Primary Examiner* — Abby Y Lin
*Assistant Examiner* — Hossam M Abd El Latif
(74) *Attorney, Agent, or Firm* — Perman & Green LLP

(57) ABSTRACT

An aircraft fault detection system including at least one aircraft data logging device that captures a collection of time-series flight data, from at least one aircraft subsystem, for at least one flight leg of an aircraft flight, and an aircraft controller coupled to the at least one aircraft data logging device. The aircraft controller groups the collections of time-series flight data into a plurality of test states, the plurality of test states being determined from a plurality of training states and one or more of the test states is different from other test states in the plurality of test states, generates at least one test transition matrix based on the plurality of test states and determine anomalous behavior of the at least one aircraft subsystem based on the at least one test transition matrix, and forecasts a fault within the at least one aircraft subsystem based on the anomalous behavior.

20 Claims, 14 Drawing Sheets

(51) Int. Cl.
*G06N 5/04* (2006.01)
*G07C 5/08* (2006.01)

(58) Field of Classification Search
USPC .......................................................... 701/31
See application file for complete search history.

(56) References Cited

U.S. PATENT DOCUMENTS

| | | | | |
|---|---|---|---|---|
| 10,657,736 | B2* | 5/2020 | Sundareswara | G05B 23/024 |
| 2004/0176879 | A1 | 9/2004 | Menon et al. | |
| 2010/0241293 | A1* | 9/2010 | Ganguli | G08G 5/0021 |
| | | | | 701/4 |
| 2016/0104329 | A1* | 4/2016 | Sundareswara | G07C 5/0816 |
| | | | | 701/33.9 |
| 2017/0015434 | A1 | 1/2017 | McKay | |
| 2017/0206459 | A1 | 7/2017 | Kwon | |
| 2018/0053115 | A1 | 2/2018 | Vachhani et al. | |
| 2018/0348374 | A1 | 12/2018 | Laddha et al. | |
| 2019/0087789 | A1* | 3/2019 | Barkat | G07C 5/008 |
| 2019/0291863 | A1* | 9/2019 | Lyasoff | B64D 31/06 |

OTHER PUBLICATIONS

European Search Report, European Application No. 18194089 dated Feb. 14, 2019.
Arthur, et al. "K means ++: The Advantages of Careful Seeding"; Proceedings of the 18th Annual ACM-SIAM Symposium on Discrete Algorithms, 2007, pp. 1027-1035.
Byingtion, et al. "In-Line Health Monitoring System for Hydraulic Pumps and Motors"; 2003 IEEE Aerospace Conference, Proceedings, New York, vol. 7, pp. 3279-3287.
Byington, et al. "Dynamic Signal Analysis and Neural Network Modeling for Life Prediction of Flight Control Actuators"; Presented at the 60th Annual Forum of the American Helicopter Scoiety, Maryland, 2004.
Lo, et al. "Noise-Domain Reflectometry for Locating Wiring Faults"; IEEE Transations on Electromagnetic Compatability, vol. 47, No. 1, 2005, pp. 97-104.
Ghidella, et al. "Requirements-Based Testing in Aircraft Control Design"; AIAA Modeling and Simulation Technologies Conference and Exhibit, California, 2005.
Hanley, et al. "The Meaning and the Use of the Area Under a Receiver Operating Characteristic (ROC) Curve"; Radiology Journal, vol. 143, Issue 1, 1982, pp. 29-36.
Hartigan et al. "Algorithm AS 136; A K-Means Clustering Algorithm"; Journal of the Royal Statistical Society, Series C (Applied Statistics), vol. 28, No. 1, 1979, pp. 100-108.
Kaufman, et al. "Clustering by Means of Medoids"; Statisitcal Data Analysis Based on L1 Norm and Related Methods, Y. Dodge (Editor), 1987, pp. 405-416.
Kobayashi, et al. "Application of a Bank of Kalman Filters for Aircraft Engine Fault Diagnostics"; NASA—TM 2003-212526, Prepared for the Turbo Expo 2003, ARL-TR-2955 (GT2003-38550).
Smith, et al. "Analysis of Spread Spectrum Time Domain Reflectometry for Wire Fault Location"; IEEE Sensors Journal, vol. 5, No. 6, 2005, pp. 1469-1478.
Volponi, et al. "Development of an Information Fusion System for Engine Diagnostics and Health Management"; AIAA 1st intelligent Systems Technical Conference, Illinois, 2004.
Gertner, Jon. "Most Innovative Companies 2014: GE"; Retrieved from https://www.fastcompany.com/company/general-electric (Dec. 10, 2014).
Yan, et al. "Jet Engine Gas Path Fault Diagnostics Using Dynamic Fusion of Multiple Classifiers"; IEEE International Joint Conference on Neural Networks (IEEE World Congress on Computational Intelligence), 2008, pp. 1585-1591.

* cited by examiner

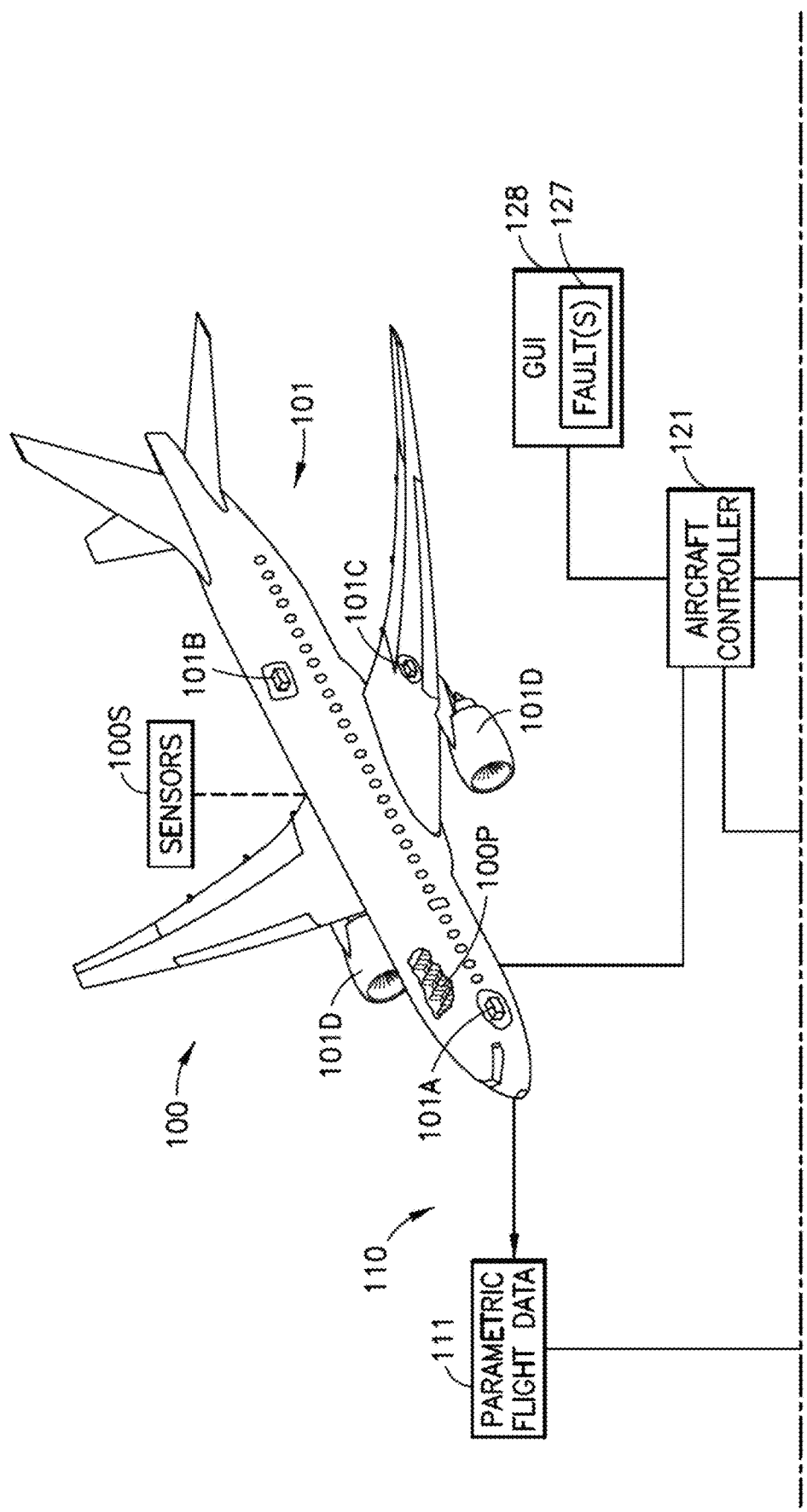

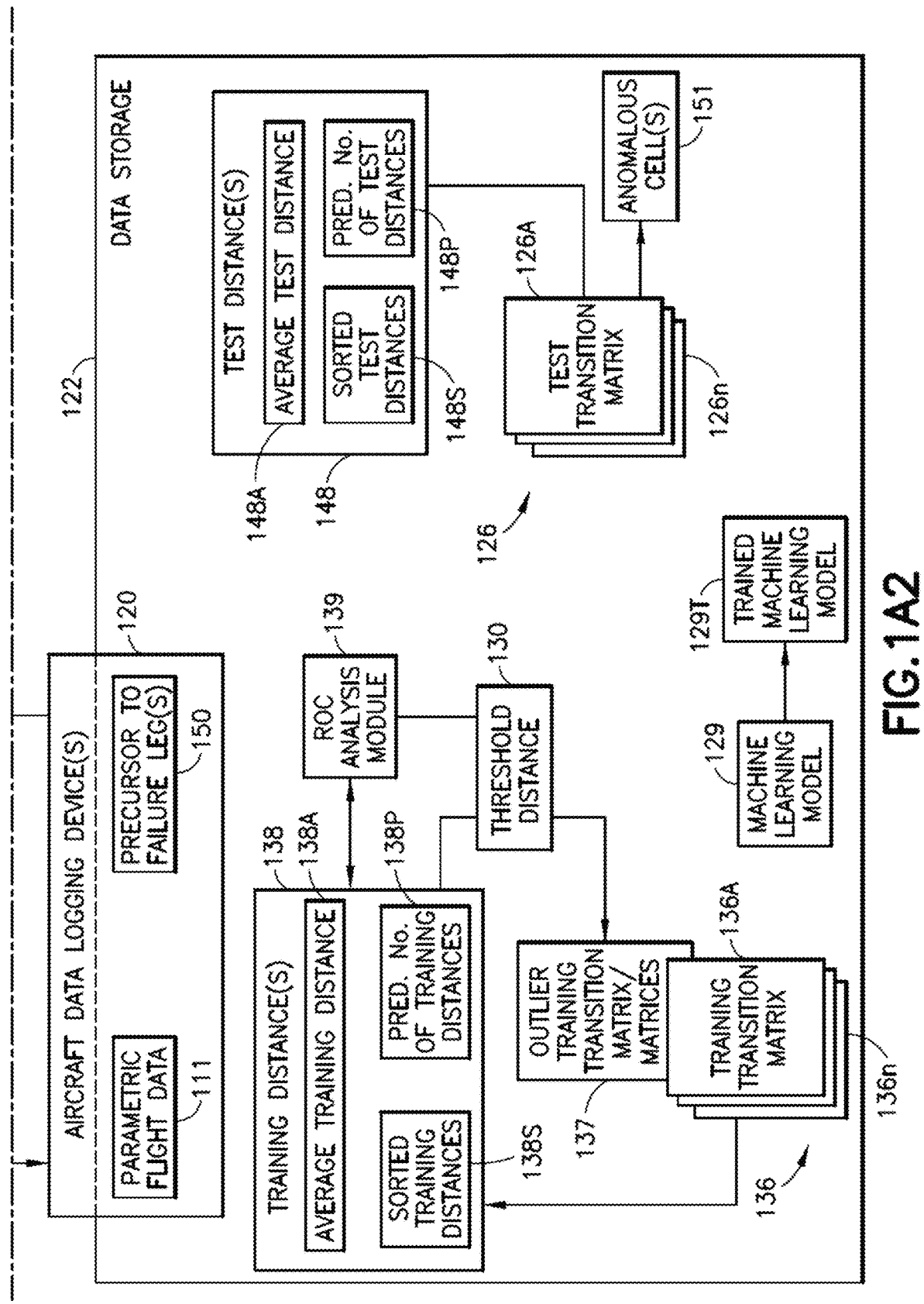
FIG.1A2

SYSTEM AND METHOD FOR AIRCRAFT FAULT DETECTION

CROSS-REFERENCE TO RELATED APPLICATIONS

This application is a continuation of and claims the benefit of U.S. Non-Provisional patent application Ser. No. 15/714,253 filed on Sep. 25, 2017, the disclosure of which is incorporated by reference herein in its entirety.

BACKGROUND

1. Field

The exemplary embodiments generally relate to fault detection and in particular to fault detection by extracting latent states for classifying precursors to faults.

2. Brief Description of Related Developments

Generally, traditional approaches to aircraft prognosis are off-line (e.g., not performed onboard the aircraft) approaches. These off-line approaches typically employ a wide variety of machine learning techniques which can be roughly classified into model based approaches and machine learning approaches.

In the model based approaches, an attempt is made to understand the physical model of the aircraft system being analyzed and what the expected values are under normal operating conditions of the aircraft system being analyzed. An alert is given by the model, generally with corresponding action items to remedy the alert, if sensory readings deviate from the expected values. The disadvantage of model based approaches is that one will have to monitor may sensory channels (or their derived features) and some combination of sensory channels (or their derived features) which may be prohibitively expensive. In addition, when the aircraft system being analyzed undergoes a change or an upgrade, where new components are added, new models have to be derived.

In the machine learning approaches, generally machine learning algorithms such as fuzzy logic classifiers and neural networks are employed to detect and classify faults of the aircraft system being analyzed. Approaches such as time-domain reflectometry and its variations may also be employed as a machine learning approach. Time-domain reflectometry approaches pertain to propagation of a step energy or spread spectrum signal function into the aircraft system and subsequent statistical analysis of the returned signal's magnitude, shape and duration to detect the presence of a fault.

SUMMARY

Accordingly, apparatuses and methods, intended to address at least one or more of the above-identified concerns, would find utility.

The following is a non-exhaustive list of examples, which may or may not be claimed, of the subject matter according to the present disclosure.

One example of the subject matter according to the present disclosure relates to an aircraft fault detection system comprising: at least one aircraft data logging device configured to capture parametric flight data from at least one aircraft subsystem; and an aircraft controller coupled to the data logging device, the aircraft controller being configured to group the parametric flight data from the at least one aircraft subsystem into a plurality of test states, one or more of the test states being different from other test states in the plurality of test states, generate at least one test transition matrix based on the plurality of test states and determine anomalous behavior of the at least one aircraft subsystem based on the at least one test transition matrix, and forecast faults within the at least one aircraft subsystem based on the anomalous behavior of the at least one aircraft subsystem determined from the at least one test transition matrix.

Another example of the subject matter according to the present disclosure relates to a method for aircraft fault detection, the method comprising: capturing, with at least one aircraft data logging device, parametric flight data from at least one aircraft subsystem; grouping, with an aircraft controller coupled to the data logging device, the parametric flight data from the at least one aircraft subsystem into a plurality of test states, one or more of the test states being different from other test states in the plurality of test states; generating, with the aircraft controller, at least one test transition matrix based on the plurality of test states and determine anomalous behavior of the at least one aircraft subsystem based on the at least one test transition matrix; and forecasting, with the aircraft controller, faults within the at least one aircraft subsystem based on the anomalous behavior of the at least one aircraft subsystem determined from the at least one test transition matrix.

Still another example of the subject matter according to the present disclosure relates to a method for aircraft fault detection, the method comprising: capturing, with at least one aircraft data logging device, parametric flight data from at least one aircraft subsystem; and forecasting, with an aircraft controller, faults within the at least one aircraft subsystem based on anomalous behavior of the at least one aircraft subsystem determined from at least one test transition matrix; wherein the at least one test transition matrix is generated with the aircraft controller by grouping the parametric flight data from the at least one aircraft subsystem into a plurality of test states, where one or more of the test states is different from other test states in the plurality of states, for more than one time point in the parametric flight data, identifying a current state of a subject matter expert identified test variable of the parametric flight data and counting a frequency the subject matter expert identified test variable transitions from the current state to another state or to a same state (i.e., remains at the current state) at a next sequential time point, and normalizing the frequency so that one or more entry in a respective cell of a respective test transition matrix is a probability number that lies between zero and one.

BRIEF DESCRIPTION OF THE DRAWINGS

Figure 1B:
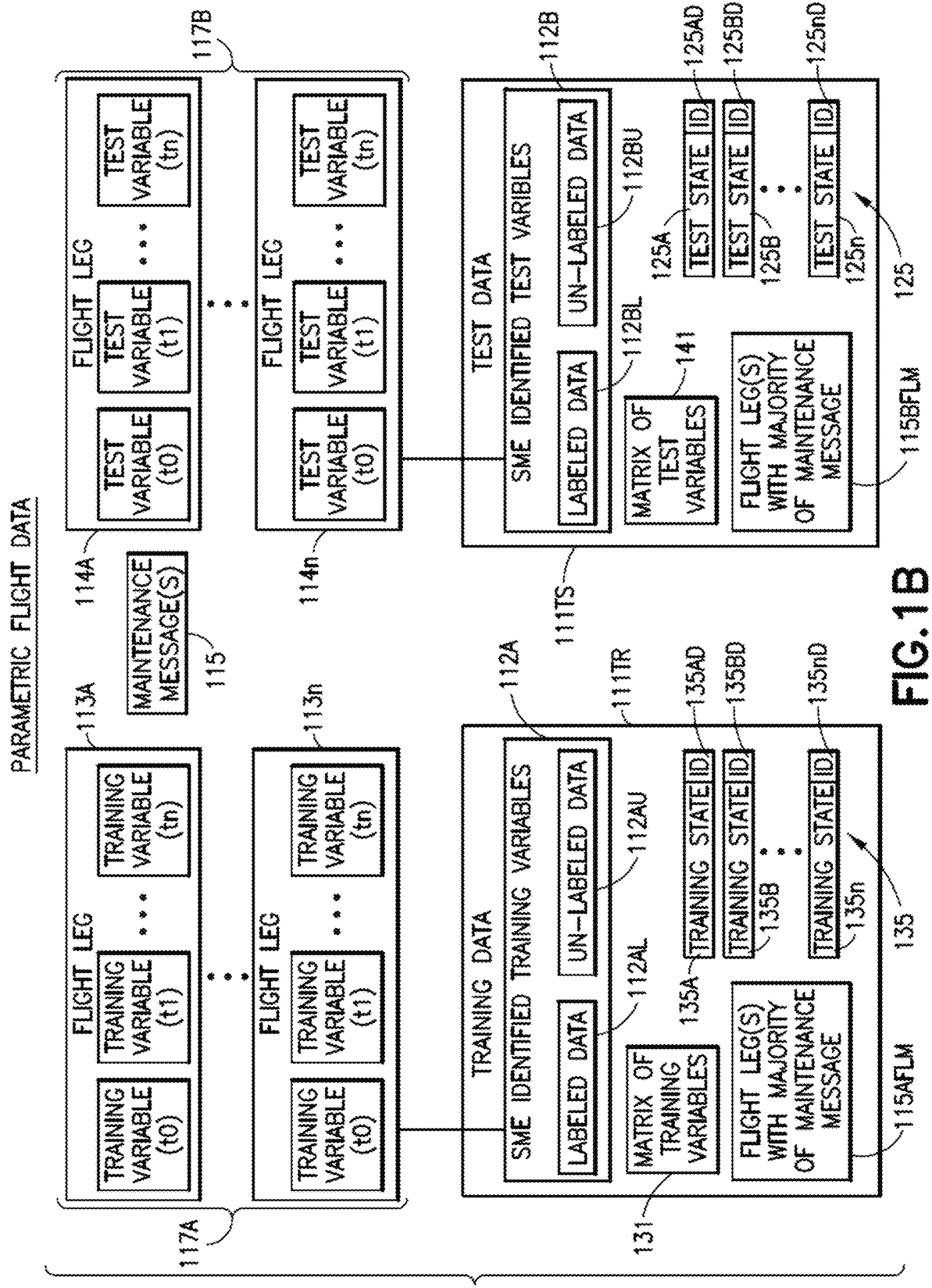
Figure 1C:
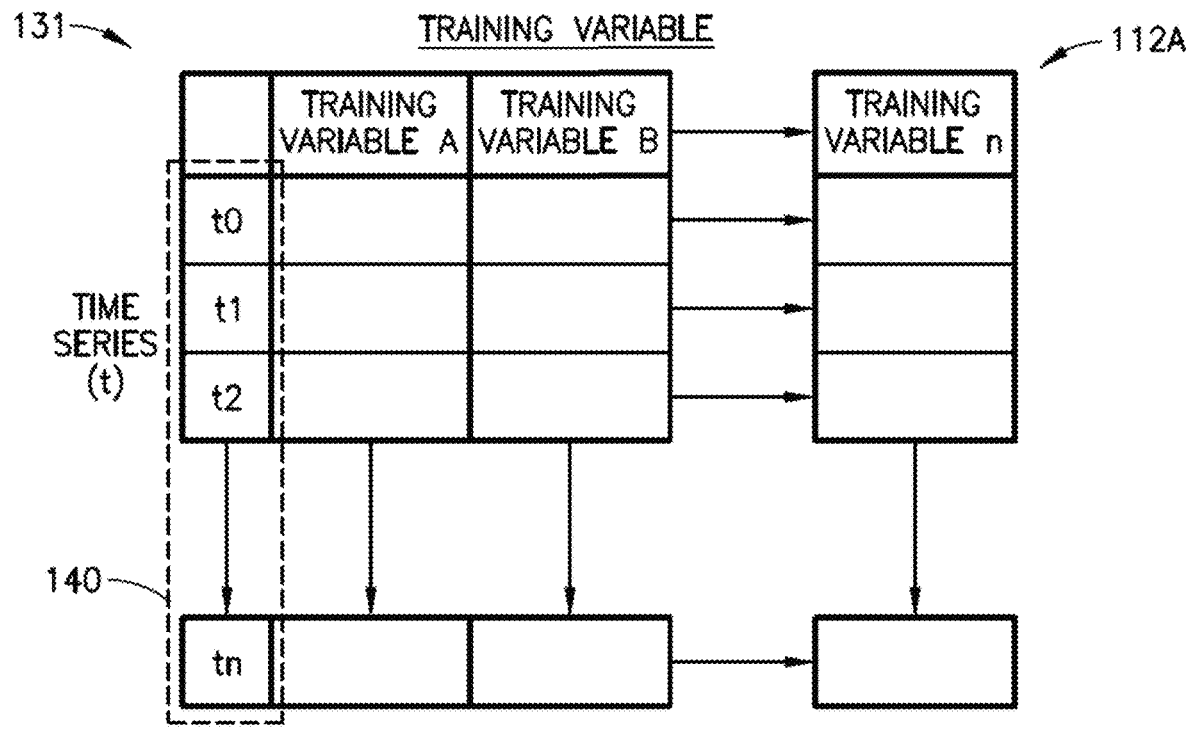
Figure 1E:
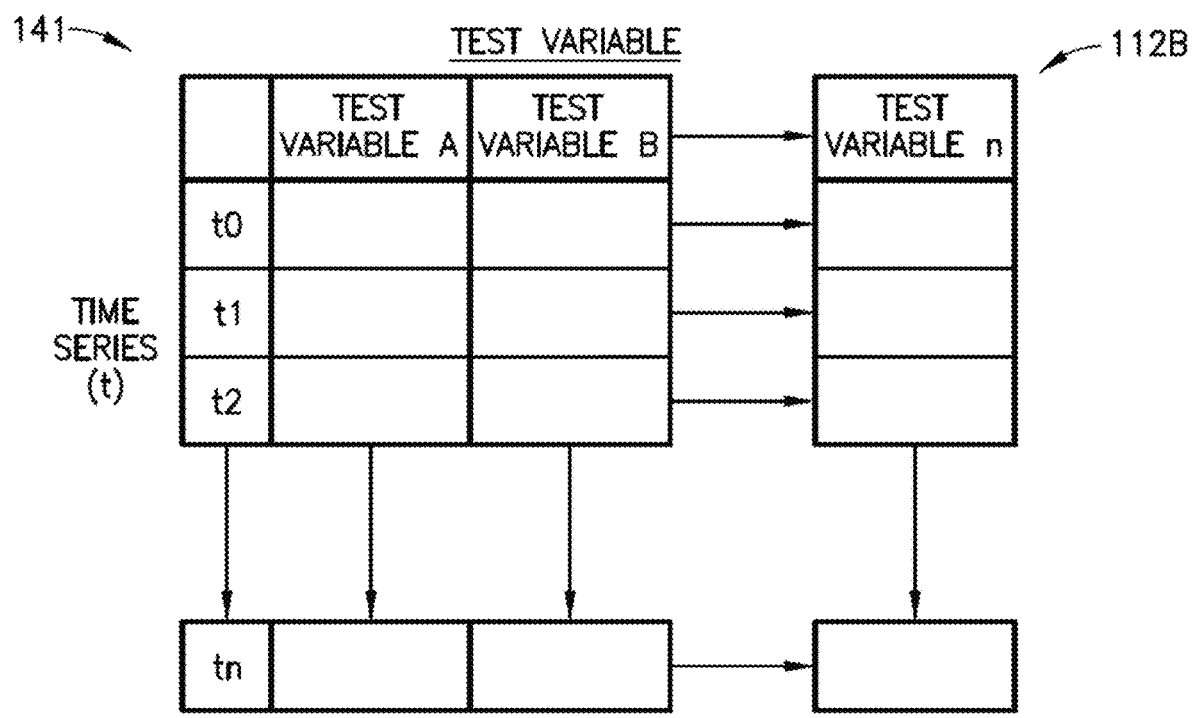
Figure 1D:
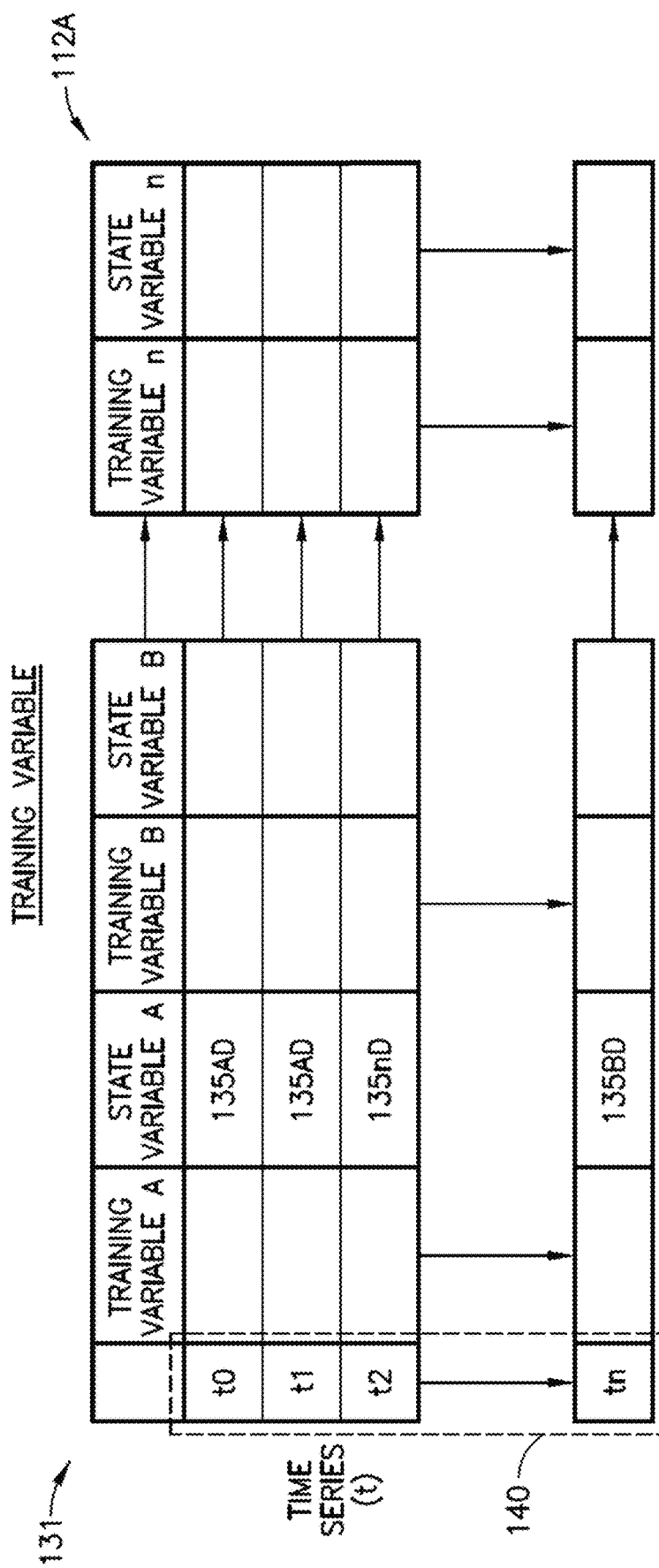
Figure 1F:
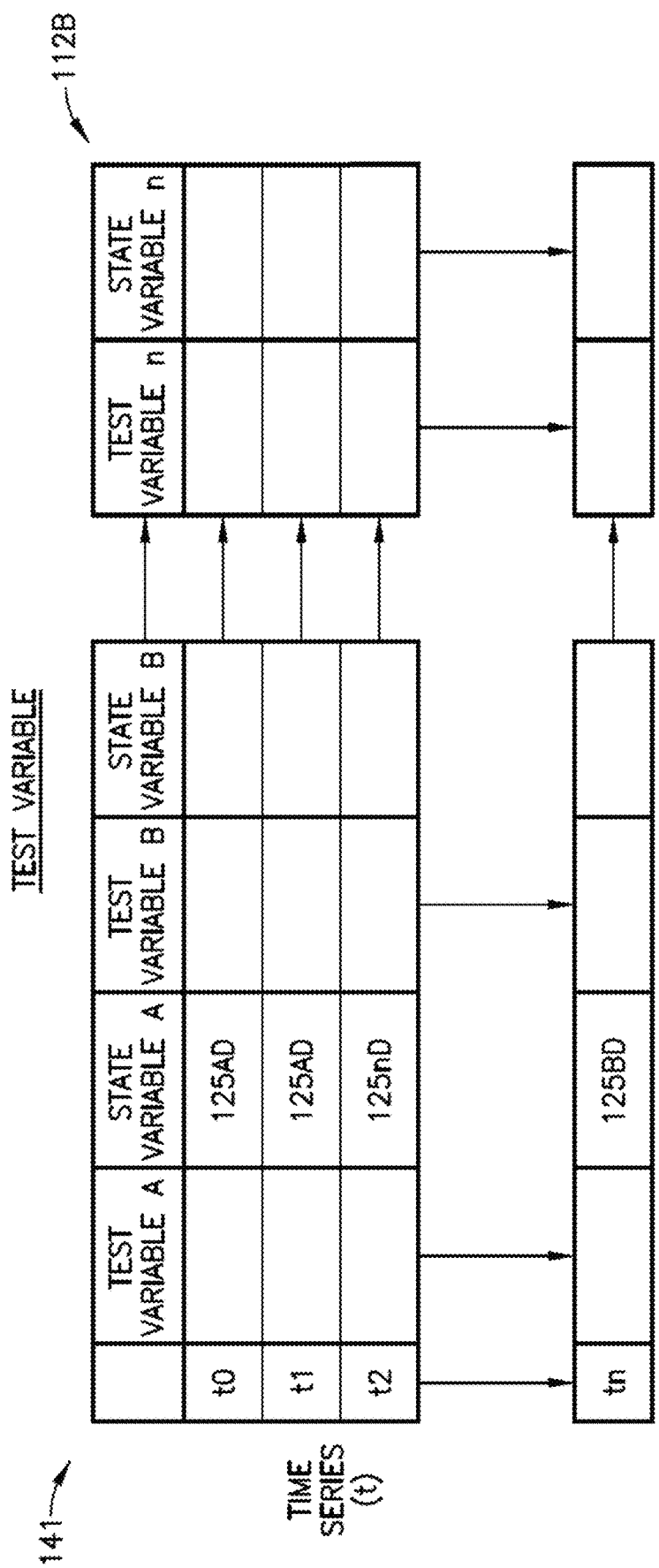
Figure 1G:
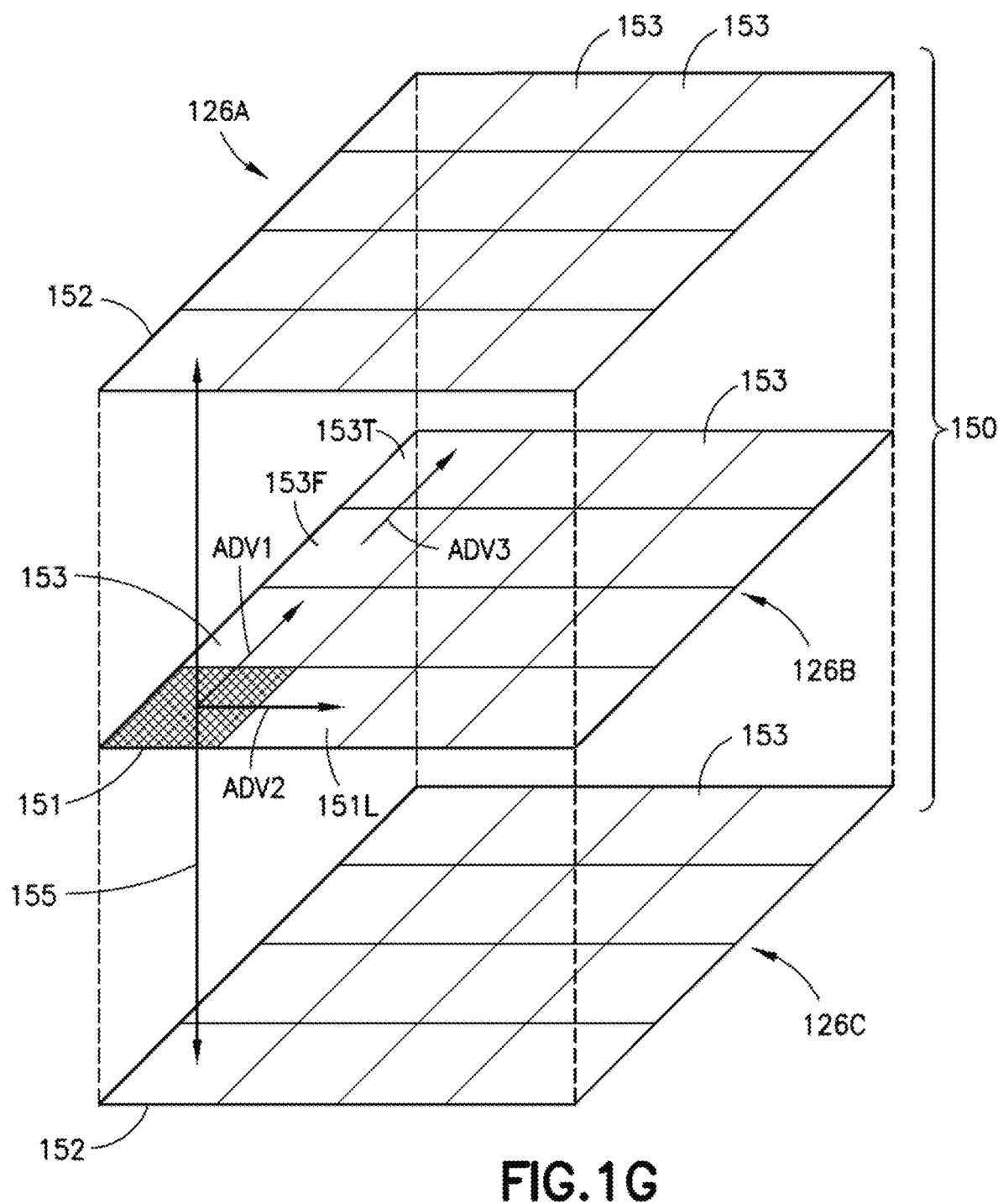
Figure 2:
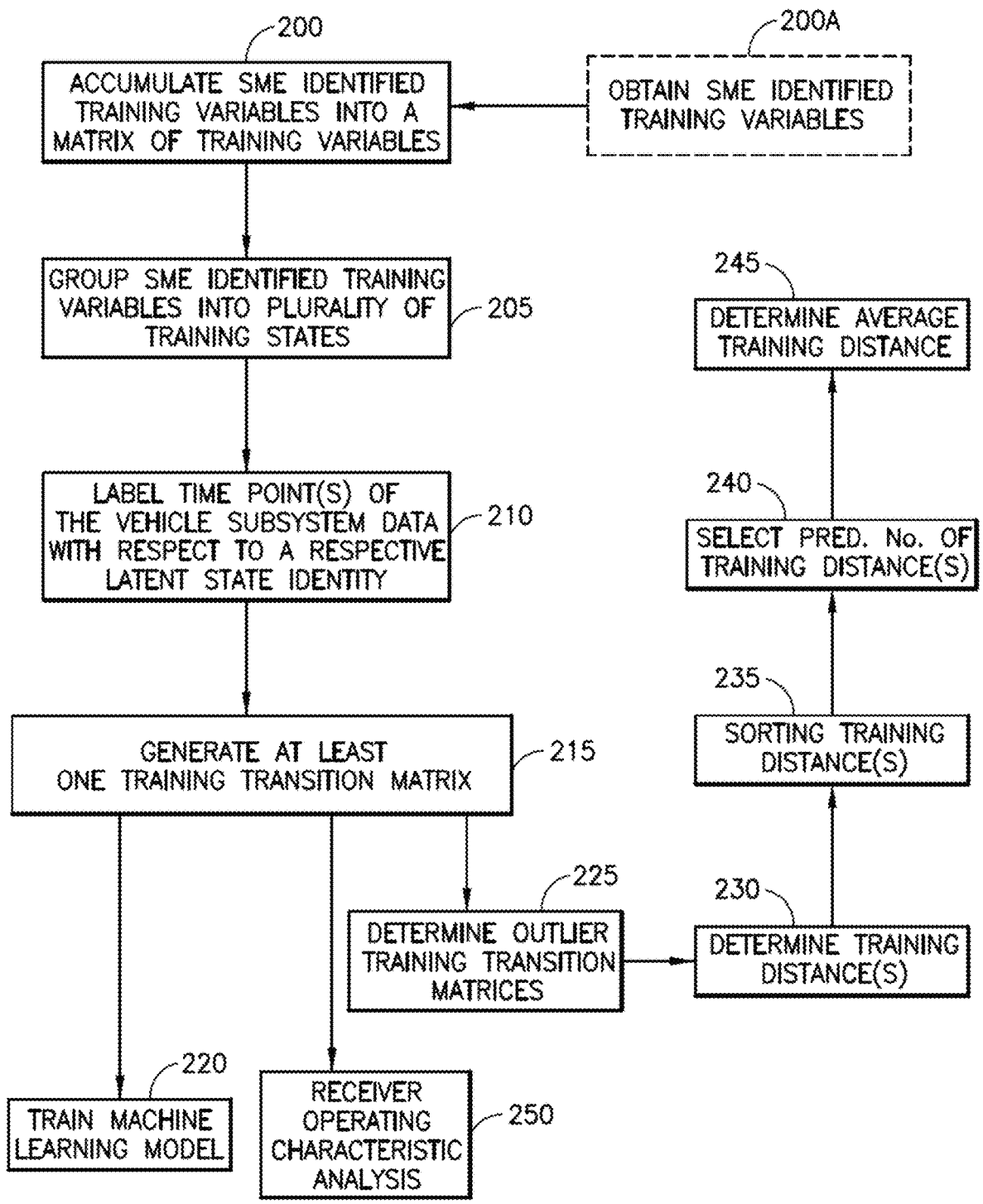
Figure 3:
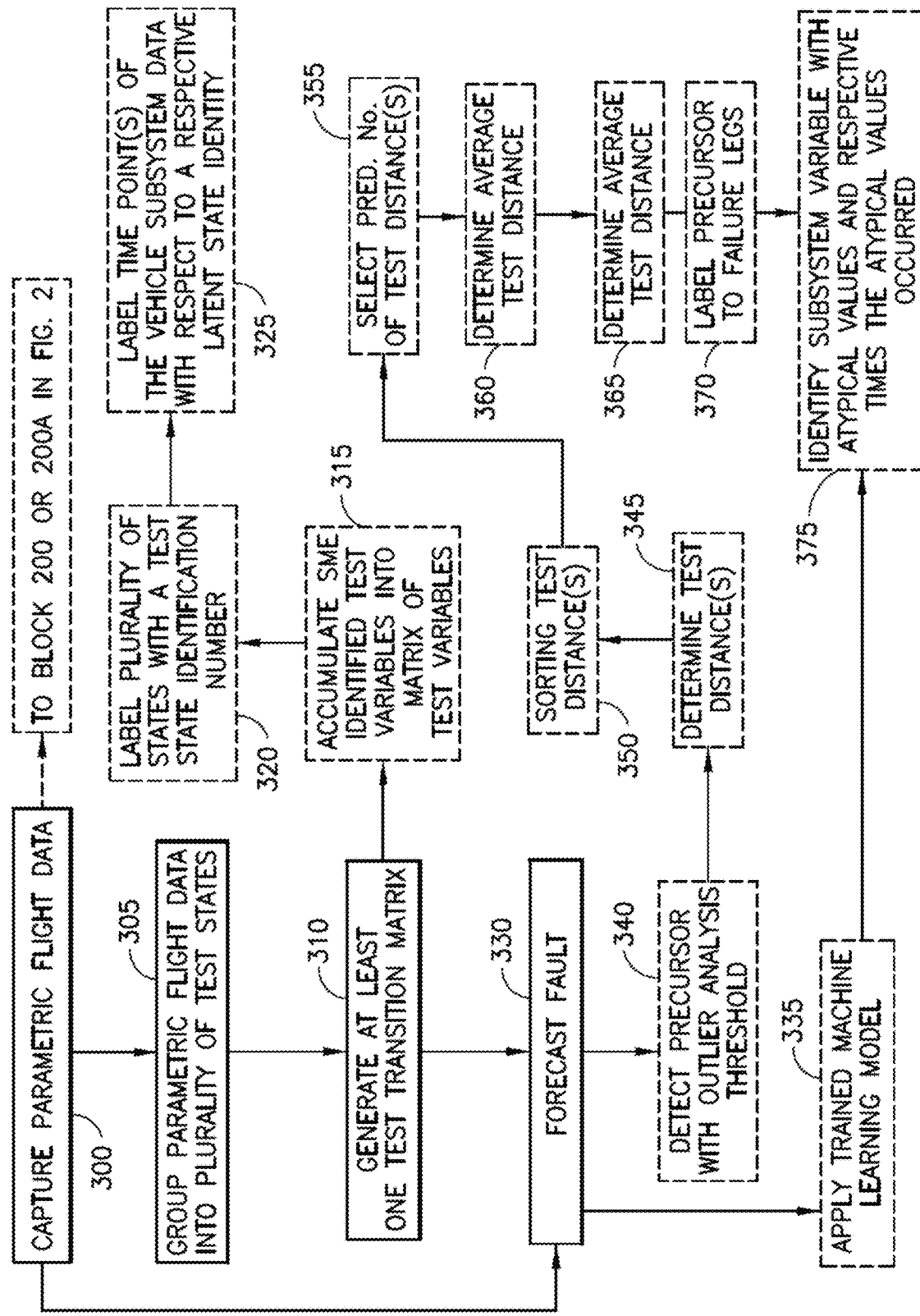
Figure 4:
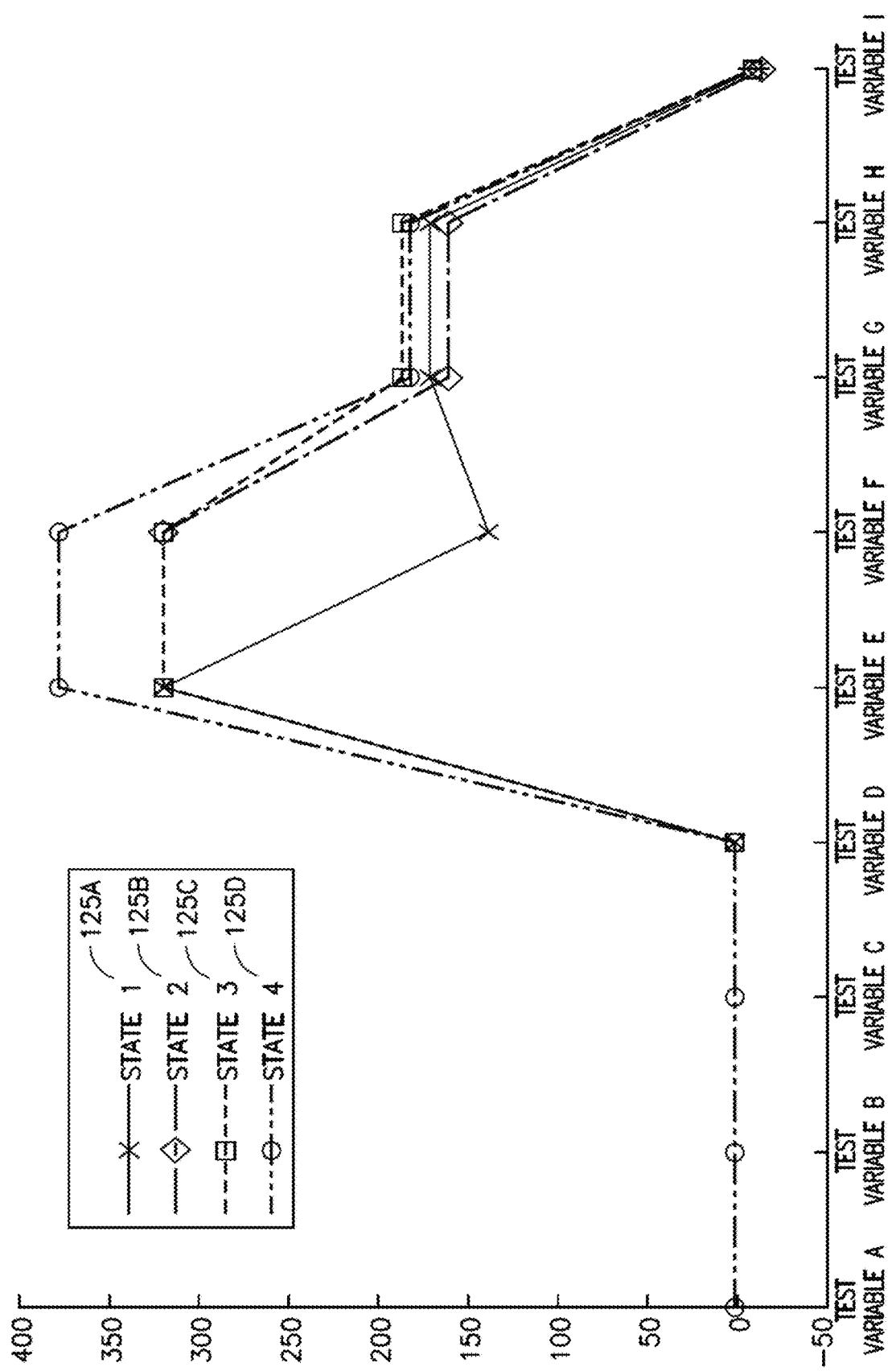
Figure 5:
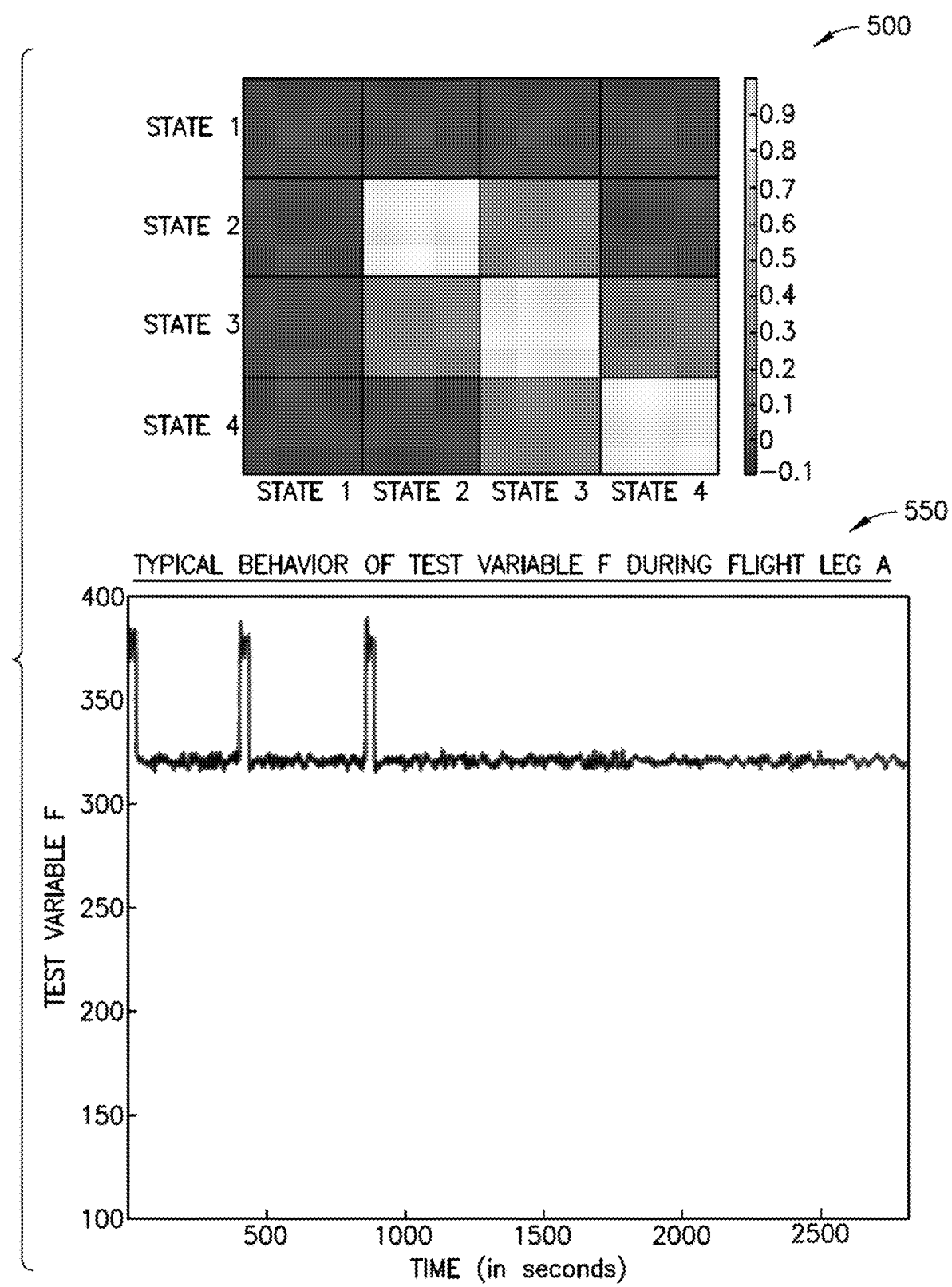
Figure 6:
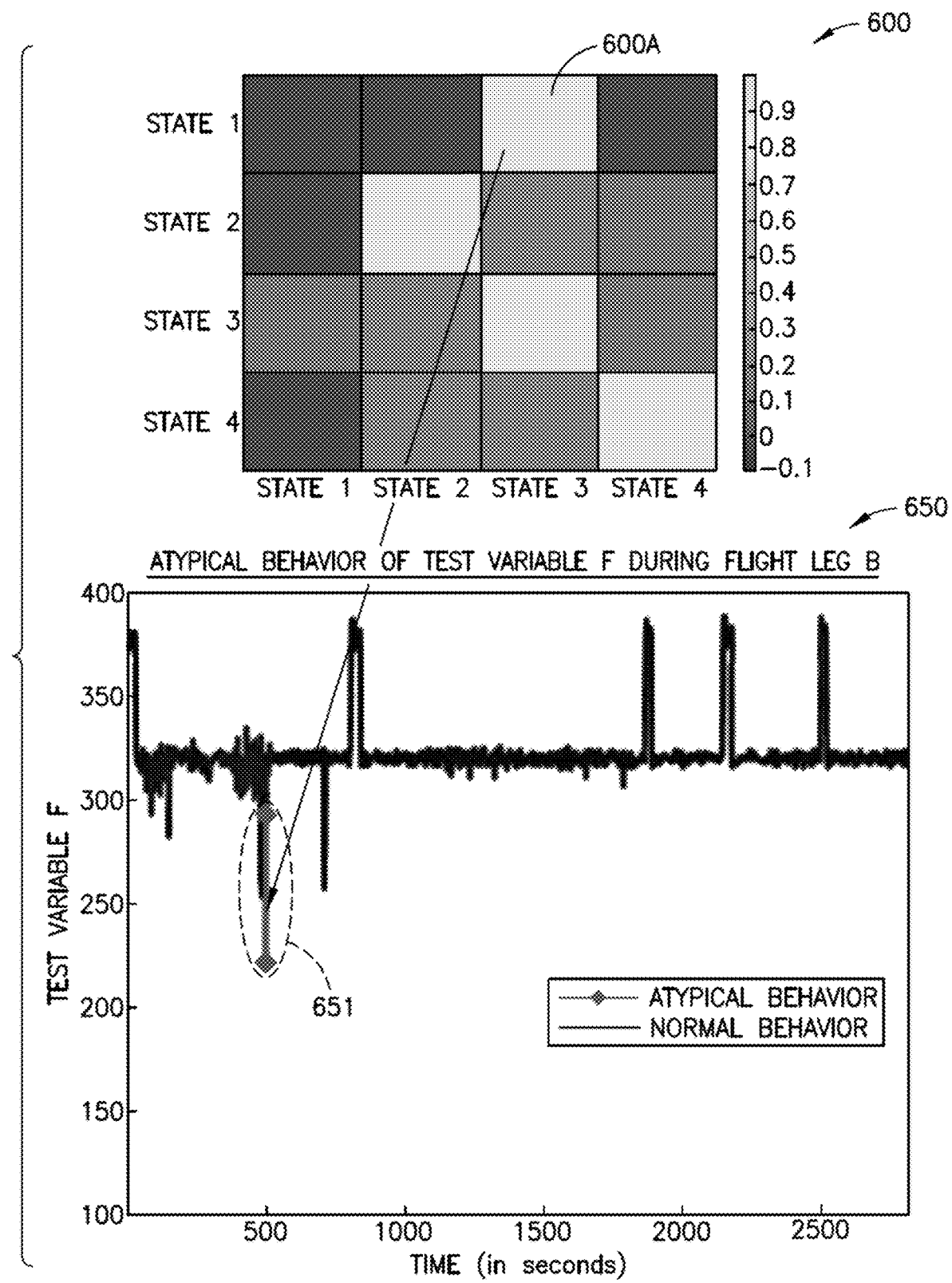
Figure 7:
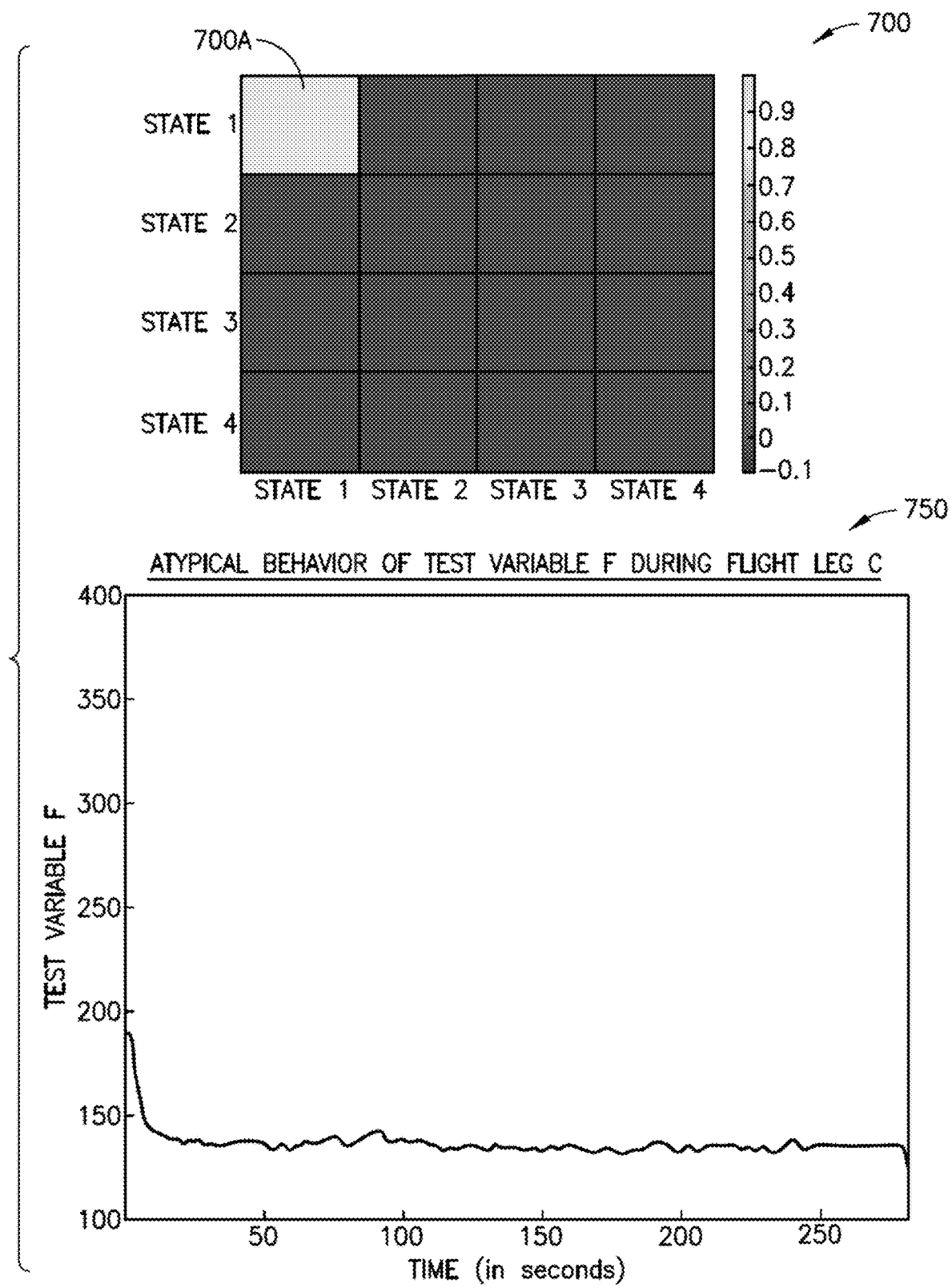
Figure 8:
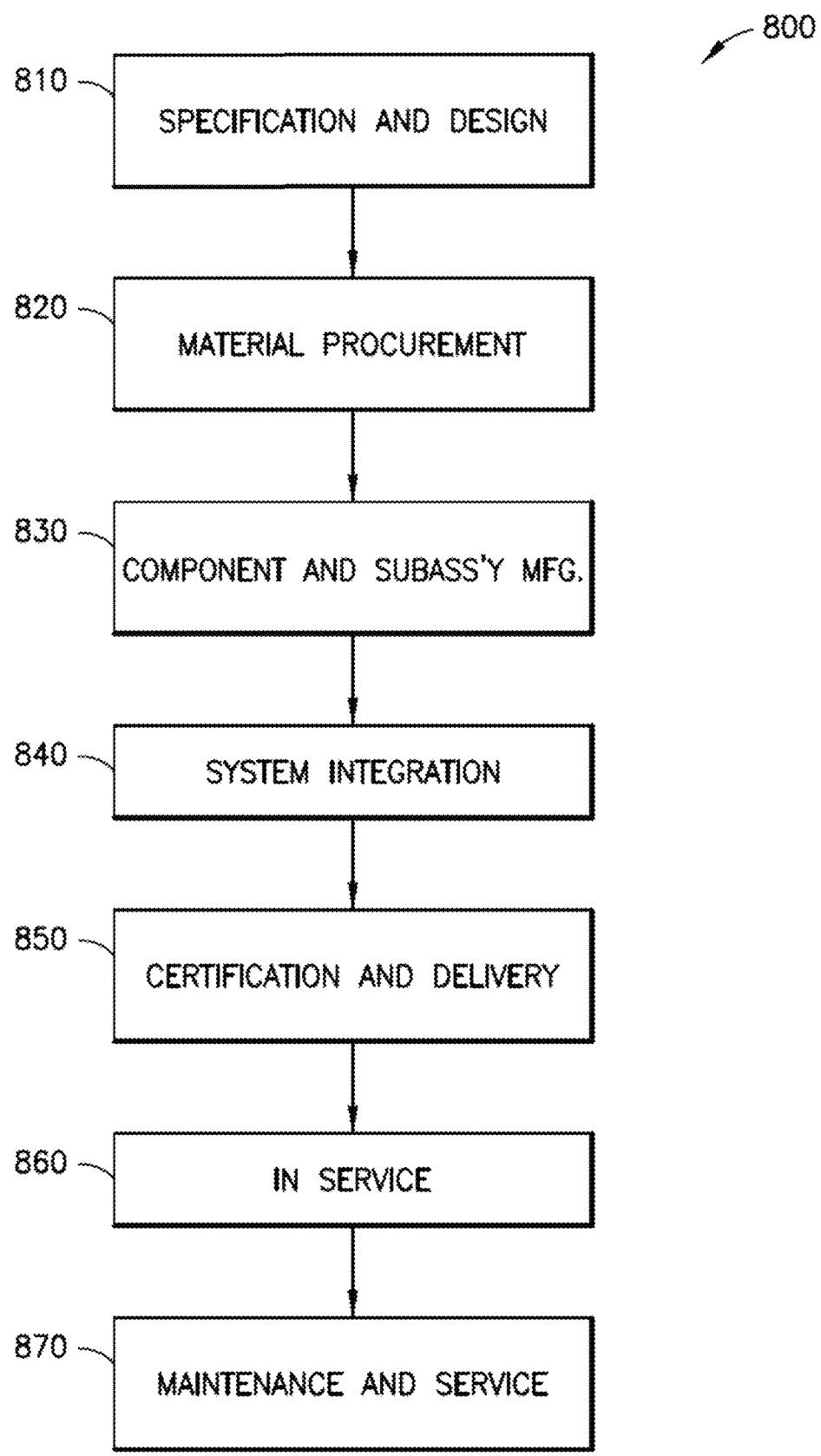

Having thus described examples of the present disclosure in general terms, reference will now be made to the accompanying drawings, which are not necessarily drawn to scale, and wherein like reference characters designate the same or similar parts throughout the several views, and wherein:

FIGS. 1A1 and 1A2 (referred to herein as FIG. 1A) are a schematic block diagram of an aircraft including a fault detection system in accordance with one or more aspects of the present disclosure;

FIG. 1B is a schematic block diagram of a portion of the fault detection system of FIG. 1A in accordance with one or more aspects of the present disclosure;

FIGS. 1C and 1D are exemplary matrices of training variables in accordance with one or more aspects of the present disclosure;

FIGS. 1E and 1F are exemplary matrices of subject matter expert identified test variables in accordance with one or more aspects of the present disclosure;

FIG. 1G is an exemplary illustration of test transition matrices in accordance with one or more aspects of the present disclosure;

FIG. 2 is a flow diagram for training the fault detection system of FIGS. 1A and 1B in accordance with one or more aspects of the present disclosure;

FIG. 3 is a flow diagram for testing parametric flight data with the fault detection system of FIGS. 1A and 1B in accordance with one or more aspects of the present disclosure;

FIG. 4 illustrates an exemplary latent state graph in accordance with one or more aspects of the present disclosure;

FIG. 5 illustrates an exemplary graph corresponding to a parametric flight data variable exhibiting typical/normal behavior and a corresponding transition matrix for the parametric flight data variable exhibiting typical/normal behavior in accordance with one or more aspects of the present disclosure;

FIG. 6 illustrates an exemplary graph corresponding to the parametric flight data variable of FIG. 5 exhibiting atypical/abnormal behavior and a corresponding transition matrix for the parametric flight data variable exhibiting atypical/abnormal behavior in accordance with one or more aspects of the present disclosure;

FIG. 7 illustrates an exemplary graph corresponding to the parametric flight data variable of FIG. 5 exhibiting atypical/abnormal behavior and a corresponding transition matrix for the parametric flight data variable exhibiting atypical/abnormal behavior in accordance with one or more aspects of the present disclosure; and FIG. 8 is a flow chart of an aircraft production and service methodology.

DETAILED DESCRIPTION

Referring to FIG. 1A, the aspects of the present disclosure described herein provide a fault detection system 110 for detecting faults in an aircraft 100, or any other suitable maritime, aerospace, and/or automotive vehicle. The aspects of the present disclosure described herein may also be applied to any suitable system, such as an electrical and/or mechanical system apart from a vehicle, such as a machine tool, electricity distribution networks, etc., where sensor data is gathered to monitor the operation of the system.

The aspects of the present disclosure provide a data driven (e.g., free of physical models) approach for determining faults. As such, new physical models of the system being analyzed need not be generated when the system is modified. In the aspects of the present disclosure the fault detection system 110 defines a plurality of latent states (referred to herein as "states" for convenience) from parametric flight data 111, the parametric flight data 111 being obtained from one or more systems and/or subsystems (referred to herein as "subsystems" for convenience) of the aircraft 100. The fault detection system 110 generates at least one transition matrix from the states and forecasts a faults based on the transitions/relationships among the states.

Illustrative, non-exhaustive examples, which may or may not be claimed, of the subject matter according to the present disclosure are provided below.

Referring to FIGS. 1A and 1B, the aircraft 100 may be any suitable aircraft having at least one aircraft subsystem 101. For example, the aircraft 100 may include an electrical subsystem 101A, a hydraulic subsystem 101C, a propulsion subsystem 101D, and an environmental subsystem 101B. The environmental subsystem 101B may at least provide fresh air to an interior 100P of the aircraft. Each of the electrical subsystem 101A, the hydraulic subsystem 101C, the propulsion subsystem 101D, and the environmental subsystem 101B include respective sensors 100S that are configured to capture corresponding parametric flight data 111. The parametric flight data 111 includes training data 111TR (see FIG. 1B) and test data 111TS (see FIG. 1B). The training data 111TR includes one or more of subject matter expert ("SME") identified training variables 112A for the at least one aircraft subsystem 101 and a flight leg where a majority of maintenance messages 115AFLM for the at least one aircraft subsystem 101 occur. A flight leg 113A-113n (as well as 114A-114n) generally is a leg of flight from a departure gate to an arrival gate which may include multiple phases such as for example, engine start, taxi-out, take-off, climb, cruise, descend, taxi-in, etc. The test data 111TS includes one or more of subject matter expert identified test variables 112B for the at least one aircraft subsystem 101 and a flight leg where a majority of maintenance messages 115BFLM for the at least one aircraft subsystem 101 occur. The subject matter expert identified test variables 112B correspond to subject matter expert identified training variables 112A so that machine learning models and thresholds trained and/or determined by the fault detection system 110 with the training data 111TR can be used to forecast faults using the test 111TS. The subject matter expert identified training variables 112A and test variables 112B may each (or one or more) include a collection of time-series data 117A, 117B collected during each (or one or more) flight leg 113A-113n, 114A-114n of an aircraft 100 flight.

Still referring to FIGS. 1A and 1B, the aircraft fault detection system 110 includes at least one aircraft data logging device 120 and an aircraft controller 121. The at least one aircraft data logging device 120 is configured to capture the parametric flight data 111 from at least one aircraft subsystem 101. The at least one aircraft data logging device 120 may include any suitable data logging device such as, for example, one or more of a flight data recorder, a quick access record, a continuous parameter logging system, and an enhanced airborne flight recorder. The data logging device 120 may be configured to store the parametric flight data 111 in any suitable data storage 122. For example, the data logging device 120 may include or be configured to access data storage 122 for storing the parametric flight data 111.

The aircraft controller 121 is coupled to the data logging device 120 and/or data storage 122 in any suitable manner (e.g., wired or wirelessly) so that the aircraft controller 121 can retrieve data from and store data to one or more of the aircraft data logging device 120 and data storage 122. The aircraft controller 121 includes any suitable non-transitory program code so that the aircraft controller 121 is configured to train a machine learning model 129 (e.g., to produce a trained machine learning model 129T from the machine learning model 129) and/or determine any suitable predetermined threshold, such as a threshold distance 130. The trained machine learning model 129T and/or the threshold distance 130 may be employed by the aircraft controller 121 to forecast the fault(s) 127.

As an example, the aircraft controller 121 is configured to accumulate the subject matter expert identified training variables 112A into a matrix of training variables 131. One example, of the matrix of training variables 131 is illustrated in FIG. 1C however; the matrix of training variables 131 may have any suitable format and include any suitable number of variables. Here the matrix of training variables 131 includes a time series t0-tn of training variables A-n. The controller 121 is configured to group the subject matter expert identified training variables 112A, in any suitable manner, into a plurality of training states 135 and label each (or one or more) of the plurality of training states 135A-135n with a training state identification number 135AD-135nD. For example, the controller 121 is configured to group the subject matter expert identified training variables 112A into a plurality of training states 135 with Dirichlet Process Gaussian Mixture Models, K-medoids clustering, K-means clustering, or any other suitable clustering method including, but not limited to, connectivity-based clustering, centroid based clustering, distribution based clustering, and density based clustering. A number of the plurality of training states 135 determines a number of a plurality of test states 125.

Referring to FIGS. 1A, 1B, 1C and 1D, the controller is further configured to label at least one time point t0-tn in the matrix of training variables 131 according to a corresponding training state identification number 135AD-135nD (see the "State Variable A" example, in FIG. 1D), and generate at least one training transition matrix 136 for at least one flight leg 113A-113n (FIG. 1B) of the training data 111TR. The aircraft controller 121 is configured to generate the at least one training transition matrix 136 by, for every time point t0-tn in the matrix of training variables 131, identify the current state for the respective training variable A-n for a given time point t0-tn and count the frequency of times the respective training variable A-n transitions from the current state (i) to another state (j) or the same state (i) at the next time point t1-tn. The aircraft controller 121 is configured to normalize the frequency so that each (or one or more) entry in the at least one training transition matrix 136 is a probability that lies between 0 and 1.

Referring to FIGS. 1A and 1B, the controller 121 is configured to train a machine learning model 129 (e.g., to produce a trained machine learning model 129T from the machine learning model 129) and/or determine any suitable predetermined threshold (using an outlier analysis), such as a threshold distance 130 depending on whether the training data 111TR is labeled data 112AL or unlabeled data 112AU. Labeled data 112AL is data that is known as being good/normal operational data or known as being bad/atypical operational data. Data may be labeled bad/atypical operational data where it is known that the flight leg 113A-113n from which the data came experienced a maintenance message 115 or where it is known that the data is indicative of a precursor to failure leg 150 (e.g., the labeled data identifies one or more of a flight leg 113A-113n that experienced a maintenance message 115 and data in a flight leg that is indicative of a fault). Unlabeled data 112AU is data that is not known as being good or bad.

Where the training data 111TR is labeled data 112AL, the aircraft controller is configured to train the machine learning model 129 (to generate the trained machine learning model 129T), with the labeled training data 111TR, so that the machine learning model 129 learns which of the at least one training transition matrix 136 corresponds to normal aircraft subsystem 101 operation and which of the at least one training transition matrix corresponds to faulty aircraft subsystem 101 operation. As an example, the machine learning model 129 may be a decision tree or any other suitable machine learning model.

Where the training data 111TR is not labeled or some of the at least one flight leg 113A-113n experienced a maintenance message 115, the aircraft controller 121 is configured to determine outlier training transition matrices 137 from the at least one training transition matrix 136 to identify a threshold distance 130. For example, the aircraft controller 121 is configured to determine the outlier training transition matrices 137 by determining a training distance 138 of every training transition matrix 136A-136n of the at least one training transition matrix 136 to every other training transition matrix 136A-136n of the at least one training transition matrix 136. The aircraft controller 121 is configured to sort the training distance 138 for each (or one or more) training transition matrix 136A-136n by order of magnitude to generated sorted training distances 138S. The aircraft controller 121 is configured to select a predetermined number of training distances 138P having the greatest magnitude, and determine an average training distance 138A for the predetermined number of training distances 138P having the greatest magnitude. In one aspect, the predetermined number of training distances 138P is about 5 however, in other aspects the predetermined number of training distances 138P may be more or less than about 5.

Where it is known which of the at least one flight leg 113A-113n experienced a maintenance message 115, the aircraft controller 121 is configured to determine, using a receiver operating characteristic ("ROC") analysis (through the ROC analysis module 139) and the knowledge of which of the at least one flight leg 113A-113n experienced the maintenance message 115, which training distance 138 is the threshold distance 130 for a highest ratio of true positives to false positives within a predetermined time window 140 (see FIGS. 1C and 1D). In one aspect, the predetermined time window 140 is about two weeks however, in other aspects the predetermined time window 140 is greater than or less than about two weeks. Where it is not known which of the at least one flight leg 113A-113n experienced a maintenance message 115, the threshold distance 130 is about three standard deviations from the average training distance 138A however, in other aspects, the threshold distance 130 may be more or less than about three standard deviations from the average training distance 138A.

It should be understood that outlier analysis described above may also be employed with the labeled training data 112AL in lieu of the machine learning model 129. It should also be understood that the training data may include both labeled data 112AL and unlabeled data 112AU where the aircraft controller 121 is configured to use both the machine learning model 129 and the outlier analysis on the respective labeled data 112AL and unlabeled data 112AU.

Referring to FIGS. 1A and 1B, the aircraft controller 121 may also include any suitable non-transitory program code so that the aircraft controller 121 is configured to forecast the fault(s) 127 using the trained machine learning model 129T and/or the threshold distance 130. For example, the aircraft controller 121 is configured to group the parametric flight data 111, such as the test data 111TS, from the at least one aircraft subsystem 101 into a plurality of test states 125. Each (or one or more) of the test states 125A-125n being different from other test states 125A-125n in the plurality of states 125. The aircraft controller 121 is also configured to generate at least one test transition matrix 126 based on the plurality of test states 125 and determine anomalous behavior of the at least one aircraft subsystem 101 based on the at least one test transition matrix 126. The aircraft controller 121 is configured to forecast faults 127 within the at least one aircraft subsystem 101 based on the anomalous behavior of the at least one aircraft subsystem 101 determined from the at least one test transition matrix 126. The faults 127 may be presented on any suitable graphical user interface 128 to an operator of the aircraft 100 or to maintenance personnel working on the aircraft 100.

The aircraft controller 121 is configured to generate the at least one test transition matrix 126 by accumulating the subject matter expert identified test variables 112B into a matrix of test variables 141. One example, of the matrix of test variables 141 is illustrated in FIG. 1E however; the matrix of test variables 141 may have any suitable format and include any suitable number of variables. Here the matrix of test variables 141 includes a time series t0-tn of subject matter expert identified test variables 112B. The aircraft controller 121 is configured to label each (or one or more) of the plurality of test states 125 with a test state identification number 125AD-125An, and label at least one time point t0-tn in the matrix of test variables 141 (see the "State Variable A" example, in FIG. 1F) according to a corresponding test state identification number 125AD-125nD.

In one aspect, the aircraft controller 121 is configured to determine the anomalous behavior by applying the trained machine learning model 129T (FIG. 1A) to the at least one test transition matrix 126.

In one aspect, the aircraft controller 121 is configured to determine the anomalous behavior for at least one flight leg 114A-114n with an outlier analysis by determining a test distance 148 of every test transition matrix 126A-126n for a respective one of the at least one flight leg 114A-114n to every other test transition matrix 126A-126n of the respective one of the at least one flight leg 114A-114n. The aircraft controller 121 is configured to sort the test distance 148 for each (or one or more) test transition matrix 126A-126n, of the respective one of the at least one flight leg 114A-114n, by order of magnitude to generate the sorted test distances 148S. The aircraft controller 121 is configured to select a predetermined number of test distances 148P, of the respective one of the at least one flight leg 114A-114n, having the greatest magnitude. The aircraft controller 121 is configured to determine an average test distance 148A for the predetermined number of distances 148P, of the respective one of the at least one flight leg 114A-114n, having the greatest magnitude. The aircraft controller 121 is configured to compare the average test distance 148A to the threshold distance 130 and label the respective one of the at least one flight leg 114A-114n as a precursor to failure leg 150 where the average test distance 148A exceeds the threshold distance 130.

Referring to FIGS. 1A, 1B, 1E and 1F, whether the trained machine learning model 129T or the outlier analysis is employed to determine the anomalous behavior for at least one flight leg 114A-114n, the aircraft controller 121 is configured to, for each (or one or more) precursor to failure leg 150, identify the subject matter expert identified test variables 112B and a respective time t0-tn within the respective one of the at least one flight leg 114A-114n the subject matter expert identified test variable 112B was anomalous. Here, the aircraft controller 121 is configured to identify the subject matter expert identified test variables 112B and the respective time t0-tn within the respective one of the at least one flight leg 114A-114n the subject matter expert identified test variable 112B was anomalous by identifying anomalous cells 151 within every test transition matrix 126A-126n in the precursor to failure leg 150. An anomalous cell 151 is a cell in the test transition matrix 126A-126n that is more than two standard deviations (and in other aspects, more or less than two standard deviations) from a normal cell of the same type 152 within the precursor to failure leg 150. What this means is, referring to FIG. 1G, if the at least one test transition matrix 126 were stacked one above the other so that the cells 153 line up with each other to form multiple columns 155, the cells 153 that are directly above and below a predetermined cell, such as the anomalous cell 151 are normal cells of the same type 152 in that these cells for the column 155 of cells having the same position in the respective transition matrix 126A, 126B, 126C.

For each (or one or more) anomalous cell 151, if the anomalous cell 151 corresponds to a first time period t0 of a phase of the at least one flight leg 114A-114n, the aircraft controller 121 is configured to determine an absolute difference vector ADV1, ADV2 between a center of a next state cell (j) (i.e., the "to" cell) and a center of a cell 153 that corresponds to the first time period t1-tn that is entered in a non-anomalous cell. If the anomalous cell 151 remains in a same state (e.g., i=j) for consecutive time periods t0-tn, the aircraft controller 121 is configured to determine an absolute difference vector ADV1, ADV2 between a center of the anomalous cell 151 to a center of a cell having a state that corresponds to a last anomalous cell 151L the precursor to failure leg 150 was in before entering the anomalous cell 151. Otherwise, the aircraft controller 121 is configured to determine an absolute difference vector ADV3 between a center of a cell 153F (e.g., the current state cell (i)) from which the precursor to failure leg 150 transitioned from and a center of a cell 153T (e.g., the next state cell (j)) to which the precursor to failure leg 150 transitioned to. If a dimension of the absolute difference vector ADV1, ADV2, ADV3 is above a predetermine number of standard deviations from a mean of a corresponding dimension of the absolute difference vectors ADV1, ADV2 for every anomalous cell 151, the subject matter expert identified test variable 112B corresponding to the dimension is flagged as indicating a fault 127. The subject matter expert identified test variable 112B corresponding to the dimension of the absolute difference vector ADV1, ADV2, ADV3 may be presented as a fault 127 on the graphical user interface 128 (FIG. 1) with any suitable corrective action to prevent the occurrence of a maintenance message and/or failure of the subsystem 101 to which the subject matter expert identified test variable 112B corresponds.

The aircraft controller 121 is configured to identify when the precursor to failure leg 150 entered the anomalous cell 151 and identify a period of time t0-tn the precursor to failure leg 150 remained in the anomalous cell 151. When the precursor to failure leg 150 entered the anomalous cell 151 and the duration the precursor to failure leg 150 remained in the anomalous cell 151 may also be presented as the fault 127 on the graphical user interface 128 (FIG. 1) where the duration the precursor to failure leg 150 remained in the anomalous cell 151 may indicate the imminence (e.g., a time frame) in which the failure will occur. For example, the longer the precursor to failure leg 150 remained in the anomalous cell 151 the sooner the failure will occur.

Referring now to FIGS. 1A, 1B, 2 and 3 and exemplary method for aircraft 100 fault detection will be described. According to the method, at least one aircraft data logging device 120 captures parametric flight data 111 from at least one aircraft subsystem 101 (FIG. 3, Block 300). In one aspect, this captured parametric flight data 111 may be stored in any suitable memory so as to form the training data 111TR while in other aspects, where the fault detection system 110 is already trained the captured parametric flight data 111 forms the test data 111TS. Where the parametric flight data forms the training data 111TR, the subject matter expert identified training variables 112A are obtained (FIG. 2, Block 200) when the parametric flight data 111 is captured. The aircraft controller 121 accumulates the subject matter expert identified training variables 112A of the training data 111TR into the matrix of training variables 131 (FIG. 2, Block 200). The aircraft controller 121 groups the subject matter expert identified training variables 112A into the plurality of training states 135 (FIG. 2, Block 205) and labels each (or one or more) of the plurality of training states 135A-135n with a training state identification number 135AD-135nD. The aircraft controller 121 labels at least one time point t0-tn (FIG. 1C) in the matrix of training variables 131 (FIG. 1C) according to a corresponding training state identification number 135AD-135nD (FIG. 2, Block 210). The aircraft controller 121 generates at least one training transition matrix 136 (FIG. 2, Block 215) as described above for at least one flight leg 113A-113n of the training data 111TR.

In one aspect, where the training data 111TR is labeled data 112AL, the aircraft controller 121 trains the machine learning model 129 (FIG. 2, Block 220) using the labeled data 112AL so that the machine learning model 129 learns which of the at least one training transition matrix 136 corresponds to normal aircraft subsystem operation and which of the at least one training transition matrix 136 corresponds to faulty aircraft subsystem operation. As described above, the labeled data 112AL identifies one or more of a flight leg 113A-113n that experienced a maintenance message 115 and data in a flight leg 113A-113n that is indicative of a fault 127.

In one aspect, where the training data 111TR is not labeled (e.g., un-labeled data 112AU) or some of the at least one flight leg 113A-113n experienced a maintenance message 115, the aircraft controller 121 determines outlier training transition matrices 137 (FIG. 2, Block 225) from the at least one training transition matrix 136 to identify the threshold distance 130. The aircraft controller 121 determines the outlier training transition matrices 137 by determining a training distance 138 (FIG. 2, Block 230) of every training transition matrix 136A-136n of the at least one training transition matrix 136 to every other training transition matrix 136A-136n of the at least one training transition matrix 136. The aircraft controller 121 sorts the training distance 138 (FIG. 2, Block 235) for each (or one or more) training transition matrix 136A-136n by order of magnitude to create the sorted training distances 138S. A predetermined number of training distances 138P having the greatest magnitude are selected (FIG. 2, Block 240) by the aircraft controller 121, and an average training distance 138A for the predetermined number of training distances 138P having the greatest magnitude is determined (FIG. 2, Block 245) by the aircraft controller 121. In one aspect, the predetermined number of training distances 138P is about 5, while in other aspects the predetermined number of training distances 138P is more or less than about 5.

In one aspect, where it is known which of the at least one flight leg 113A-113n experienced the maintenance message 115, the aircraft controller 121 performs a receiver operating characteristic analysis (FIG. 2, Block 250) to determine, using the receiver operating characteristic analysis and the knowledge of which of the at least one flight leg 113A-113n experienced the maintenance message 115, which training distance 138 is the threshold distance 130 for a highest ratio of true positives to false positives within a predetermined time window 140 (FIGS. 1C and 1D). In one aspect, the predetermined time window 140 is about two weeks, while in other aspects the predetermined time window 140 is more or less than about two weeks. Where it is not known which of the at least one flight leg 113A-113n experienced the maintenance message 115, in one aspect the threshold distance 130 is about three standard deviations from the average training distance 138A, while in other aspects, the threshold distance is more or less than about three standard deviations from the average training distance 138A.

Where the parametric flight data 111 forms the test data 111TS the aircraft controller 121 groups the parametric flight data 111 from the at least one aircraft subsystem 101 into a plurality of test states 125 (FIG. 3, Block 305), each (or one or more) of the test states 125A-125n being different from other test states 125A-125n in the plurality of states 125. The aircraft controller 121 generates at least one test transition matrix 126 (FIG. 3, Block 310), as described above, based on the plurality of test states 125 and determines anomalous behavior of the at least one aircraft subsystem 101 based on the at least one test transition matrix 126. For example, the at least one test transition matrix 126 is generated by accumulating the subject matter expert identified test variables 112B into a matrix of test variables 141 (see also FIGS. 1E and 1F) (FIG. 3, Block 315). Each (or one or more) of the plurality of test states 125 is labeled with a test state identification number 125AD-125nD (FIG. 3, Block 320). At least one time point t0-tn (FIGS. 1E and 1F) in the matrix of test variables 141 is labeled according to a corresponding test state identification number 125AD-125nD (FIG. 3, Block 325).

The aircraft controller 121 forecasts faults 127 (FIG. 3, Block 330) within the at least one aircraft subsystem 101 based on the anomalous behavior of the at least one aircraft subsystem 101 determined from the at least one test transition matrix 126. For example, in one aspect the aircraft controller 121 determines the anomalous behavior (e.g., identifies precursor to failure legs 150) by applying the trained machine learning model 129T (FIG. 3, Block 335) to the at least one test transition matrix 126. For each (or one or more) precursor to failure leg 150, the aircraft controller 121 identifies the subject matter expert identified test variables 112B and a respective time t0-tn (see FIGS. 1E and 1F) within the respective one of the at least one flight leg 114A-114n the subject matter expert identified test variable 112B was anomalous (FIG. 3, Block 375).

In another aspect the aircraft controller 121 detects precursor to failure legs 150 with an outlier analysis threshold (e.g., as determined in Blocks 225-250 of FIG. 2) (FIG. 3, Block 340). For example, the aircraft controller 121 determines the anomalous behavior for at least one flight leg 114A-114n by determining a test distance 148 (FIG. 3, Block 345) of every test transition matrix 126A-126n for a respective one of the at least one flight leg 114A-114n to every other test transition matrix 126A-126n of the respective one of the at least one flight leg 114A-114n. The test distance 148 for each (or one or more) test transition matrix 126A-126n, of the respective one of the at least one flight leg, is sorted (FIG. 3, Block 350) by order of magnitude. A predetermined number of test distances 148P, of the respective one of the at least one flight leg 114A-114n, having the greatest magnitude is selected (FIG. 3, Block 355) by the aircraft controller 121. An average test distance 148A for the predetermined number of distances 148P, of the respective one of the at least one flight leg 114A-114n, having the greatest magnitude is determined (FIG. 3, Block 360) by the aircraft controller 121. The aircraft controller 121 compares the average test distance 148A to the threshold distance 130 and labels the respective one of the at least one flight leg 114A-114n as a precursor to failure leg 150 (FIG. 3, Block 370) where the average test distance 148A exceeds the threshold distance 130. For each (or one or more) precursor to failure leg 150, the aircraft controller 121 identifies the subject matter expert identified test variables 112B and a respective time t0-tn (see FIGS. 1E and 1F) within the respective one of the at least one flight leg 114A-114n the subject matter expert identified test variable 112B was anomalous (FIG. 3, Block 375).

Identifying the subject matter expert identified test variables 112B and the respective time t0-tn (FIGS. 1E and 1F) within the respective one of the at least one flight leg 114A-114n the subject matter expert identified test variable 112B was anomalous (FIG. 3, Block 375) includes identifying anomalous cells 151 within every transition matrix 126A-126n in the precursor to failure leg 150, where an anomalous cell 151 is a cell that is more than two standard deviations from a normal cell of the same type 152 within the precursor to failure leg 150.

For each (or one or more) anomalous cell 151, if the anomalous cell 151 corresponds to a first time period t0 of a phase of the at least one flight leg 114A-114n, the aircraft controller 121 is configured to determine an absolute difference vector ADV between a center of a next state cell (j) (i.e., the "to" cell) and a center of a cell 153 that corresponds to the first time period t1-tn that is entered in a non-anomalous cell. If the anomalous cell 151 remains in a same state (e.g., i=j) for consecutive time periods t0-tn, the aircraft controller 121 is configured to determine an absolute difference vector ADV1, ADV2 between a center of the anomalous cell 151 to a center of a cell having a state that corresponds to a last anomalous cell 151L the precursor to failure leg 150 was in before entering the anomalous cell 151. Otherwise, the aircraft controller 121 is configured to determine an absolute difference vector ADV3 between a center of a cell 153F (e.g., the current state cell (i)) from which the precursor to failure leg 150 transitioned from and a center of a cell 153T (e.g., the next state cell (j)) to which the precursor to failure leg 150 transitioned to. If a dimension of the absolute difference vector ADV1, ADV2, ADV3 is above a predetermine number of standard deviations from a mean of a corresponding dimension of the absolute difference vectors ADV1, ADV2 for every anomalous cell 151, the subject matter expert identified test variable 112B corresponding to the dimension is flagged as indicating a fault 127. The subject matter expert identified test variable 112B corresponding to the dimension of the absolute difference vector ADV1, ADV2, ADV3 may be presented as a fault 127 on the graphical user interface 128 (FIG. 1) with any suitable corrective action to prevent the occurrence of a maintenance message 115 and/or failure of the subsystem 101 to which the subject matter expert identified test variable 112B corresponds. The aircraft controller 121 may identify when the precursor to failure leg 150 entered the anomalous cell 151 and identify a period of time the precursor to failure leg 150 remained in the anomalous cell 151. The subject matter expert identified test variable 112B corresponding to the dimension is flagged as indicating a fault 127 and the period of time the precursor to failure leg 150 remained in the anomalous cell 151 may be presented by the aircraft controller 121 on a user interface 128.

Referring now to FIGS. 4-7, the fault detection system 110 and methods described herein were applied to a fan air modulating valve (FAMV), for exemplary purposes, to illustrate the fault detection described herein. FIG. 4 illustrates a plurality of test states 125A-125D for a number of subject matter expert identified test variables 112B (e.g., test variables A-I). This example, will be applied with respect to test variable F illustrated in FIG. 4 where test state 125A indicates an abnormal state of operation and may be classified as a precursor to failure in a maintenance message 115 (FIG. 1B) that may be issued at a future time. FIG. 5 illustrates a transition matrix 500 computed, in the manner describe above, for a flight leg 114A-114n using the test variables A-I. This transition matrix 500 was computed from a flight leg 114A-114n in which the fan air modulating valve FAMV was operating normally where typical behavior (e.g., during normal operation) of the test variable F is illustrated in the graph 550. FIG. 6 illustrates a transition matrix 600 that corresponds to a precursor to failure leg 150 (FIG. 1A). An abnormal state 600A was identified in the transition matrix 600, where the abnormal state 600A represents atypical behavior 651 of the test variable F in graph 650. FIG. 7 illustrates a transition matrix 700 in which the flight leg 114A-114n remained in an abnormal state 700A throughout the duration of a phase of a flight leg 114A-114n as indicated by the atypical behavior of the test variable F in graph 750.

As described herein, the aspects of the present disclosure provides a fault detection that system 110. This fault detection system 110 provides a model-free fault determination that is able to discover latent states in time series data (such as the parametric flight data 111 described above). The fault detection system 110 computes how the latent states transition in time throughout a flight leg 113A-113n, 144A-114n (and the different phases within the respective flight legs). With the knowledge of the transition matrices 126, 136 generated from the latent states, the fault detection system 110 determines normal and atypical/abnormal operating state durations and transitions for any particular phase of the flight leg 113A-113n, 114A-114n. The fault detection system 110 was evaluated on the fan air modulating valve FAMV discussed above and it has been shown to provide fault detection rates (e.g., true positives) between about 98 to about 100% with false positive rates of between about 0.005% and about 3%. The fault detection system 110 can be used to alert ground maintenance of an impending fault, which may result in a reduction of unscheduled maintenance work, delays, fuel costs, efficiency in maintenance and savings in cost and air travel time.

Referring to FIGS. 1A and 8, examples of the present disclosure may be described in the context of aircraft manufacturing and service method 800 as shown in FIG. 8. In other aspects, the examples of the present disclosure may be applied in any suitable industry, such as e.g. automotive, maritime, aerospace, etc. as noted above. With respect to aircraft manufacturing, during pre-production, illustrative method 800 may include specification and design (block 810) of aircraft 100 and material procurement (block 820). During production, component and subassembly manufacturing (block 830) and system integration (block 840) of aircraft 100 may take place. Thereafter, aircraft 100 may go through certification and delivery (block 850) to be placed in service (block 860). While in service, aircraft 100 may be scheduled for routine maintenance and service (block 870). Routine maintenance and service may include modification, reconfiguration, refurbishment, etc. of one or more systems of aircraft 100 which may include and/or be facilitated by the fault determination described herein.

Each of the processes of illustrative method 800 may be performed or carried out by a system integrator, a third party, and/or an operator (e.g., a customer). For the purposes of this description, a system integrator may include, without limitation, any number of aircraft manufacturers and majorsystem subcontractors; a third party may include, without limitation, any number of vendors, subcontractors, and suppliers; and an operator may be an airline, leasing company, military entity, service organization, and so on.

Apparatus(es) and method(s) shown or described herein may be employed during any one or more of the stages of the manufacturing and service method 800. For example, components or subassemblies corresponding to component and subassembly manufacturing (block 830) may be fabricated or manufactured in a manner similar to components or subassemblies produced while aircraft 100 is in service (block 860). Similarly, one or more examples of the apparatus or method realizations, or a combination thereof, may be utilized, for example and without limitation, while aircraft 100 is in service (block 860) and/or during maintenance and service (block 870).

The following are provided in accordance with the aspects of the present disclosure:

A1. An aircraft fault detection system comprising:

at least one aircraft data logging device configured to capture parametric flight data from at least one aircraft subsystem; and an aircraft controller coupled to the data logging device, the aircraft controller being configured to group the parametric flight data from the at least one aircraft subsystem into a plurality of test states, one or more of the test states being different from other test states in the plurality of test states, generate at least one test transition matrix based on the plurality of test states and determine anomalous behavior of the at least one aircraft subsystem based on the at least one test transition matrix, and forecast faults within the at least one aircraft subsystem based on the anomalous behavior of the at least one aircraft subsystem determined from the at least one test transition matrix.

A2. The aircraft fault detection system of paragraph A1, wherein the at least one aircraft data logging device includes one or more of a flight data recorder, a quick access record, a continuous parameter logging system, and an enhanced airborne flight recorder.

A3. The aircraft fault detection system of paragraph A1, wherein the parametric fight data comprises a collection of time-series data collected during each flight leg of an aircraft flight.

A4. The aircraft fault detection system of paragraph A1, wherein the parametric flight data comprises training data that includes subject matter expert identified training variables for the at least one aircraft subsystem and a flight leg where a majority of maintenance messages for the at least one aircraft subsystem occur.

A5. The aircraft fault detection system of paragraph A4, wherein the aircraft controller is configured to accumulate the subject matter expert identified training variables into a matrix of training variables, group the subject matter expert identified training variables into a plurality of training states and label each of the plurality of training states with a training state identification number, label at least one time point in the matrix of training variables according to a corresponding training state identification number, and generate at least one training transition matrix for at least one flight leg of the training data.

A6. The aircraft fault detection system of paragraph A5, wherein the aircraft controller is configured to, where the training data is labeled data, train a machine learning model using the labeled data so that the machine learning model learns which of the at least one training transition matrix corresponds to normal aircraft subsystem operation and which of the at least one training transition matrix corresponds to faulty aircraft subsystem operation.

A7. The aircraft fault detection system of paragraph A6, wherein the labeled data identifies one or more of a flight leg that experienced a maintenance message and data in a flight leg that is indicative of a fault.

A8. The aircraft fault detection system of paragraph A5, wherein a number of the plurality of training states determines a number of the plurality of test states.

A9. The aircraft fault detection system of paragraph A5, wherein the aircraft controller is configured to, where the training data is not labeled or some of the at least one flight leg experienced a maintenance message, determine outlier training transition matrices from the at least one training transition matrix to identify a threshold distance.

A10. The aircraft fault detection system of paragraph A9, wherein the aircraft controller is configured to determine the outlier training transition matrices by determining a training distance of one or more training transition matrix of the at least one training transition matrix to one or more other training transition matrix of the at least one training transition matrix, sorting the training distance for the one or more training transition matrix by order of magnitude, selecting a predetermined number of training distances having the greatest magnitude, and determining an average training distance for the predetermined number of training distances having the greatest magnitude.

A11. The aircraft fault detection system of paragraph A10, wherein the predetermined number of training distances is about 5.

A12. The aircraft fault detection system of paragraph A10, wherein the aircraft controller is configured to, where it is known which of the at least one flight leg experienced the maintenance message, determine using a receiver operating characteristic analysis and the knowledge of which of the at least one flight leg experienced the maintenance message, which training distance is the threshold distance for a highest ratio of true positives to false positives within a predetermined time window.

A13. The aircraft fault detection system of paragraph A12, wherein the predetermined time window is about two weeks.

A14. The aircraft fault detection system of paragraph A10, wherein, where it is not known which of the at least one flight leg experienced a maintenance message, the threshold distance is about three standard deviations from the average training distance.

A15. The aircraft fault detection system of paragraph A1, wherein the parametric flight data comprises test data that includes subject matter expert identified test variables for the at least one aircraft subsystem and a flight leg where a majority of maintenance messages for the at least one aircraft subsystem occur.

A16. The aircraft fault detection system of paragraph A15, wherein the subject matter expert identified test variables correspond to subject matter expert identified training variables used to determine a threshold distance for determining the anomalous behavior.

A17. The aircraft fault detection system of paragraph A15, wherein the aircraft controller is configured to generate the at least one test transition matrix by accumulating the subject matter expert identified test variables into a matrix of test variables, labeling each of the plurality of test states with a test state identification number, and labeling at least one time point in the matrix of test variables according to a corresponding test state identification number.

A18. The aircraft fault detection system of paragraph A15, wherein the aircraft controller is configured to determine the anomalous behavior by applying a trained machine learning model to the at least one test transition matrix.

A19. The aircraft fault detection system of paragraph A15, wherein the aircraft controller is configured to determine the anomalous behavior for at least one flight leg by determining a test distance of one or more test transition matrix for a respective one of the at least one flight leg to one or more other test transition matrix of the respective one of the at least one flight leg, sorting the test distance for the one or more test transition matrix, of the respective one of the at least one flight leg, by order of magnitude, selecting a predetermined number of test distances, of the respective one of the at least one flight leg, having the greatest magnitude, determining an average test distance for the predetermined number of test distances, of the respective one of the at least one flight leg, having the greatest magnitude, and comparing the average test distance to a threshold distance and labeling the respective one of the at least one flight leg as a precursor to failure leg where the average test distance exceeds the threshold distance.

A20. The aircraft fault detection system of paragraph A18 or A19, wherein the aircraft controller is configured to, for each precursor to failure leg, identify the subject matter expert identified test variables and a respective time within the respective one of the at least one flight leg the subject matter expert identified test variable was anomalous.

A21. The aircraft fault detection system of paragraph A20, wherein the aircraft controller is configured to identify the subject matter expert identified test variables and the respective time within the respective one of the at least one flight leg the subject matter expert identified test variable was anomalous by identifying anomalous cells within one or more test transition matrix in the precursor to failure leg, where an anomalous cell is a cell that is more than two standard deviations from a normal cell of the same type within the precursor to failure leg, for one or more anomalous cell if the anomalous cell corresponds to a first time period of a phase of the at least one flight leg, the aircraft controller is configured to determine an absolute difference vector between a center of a next state cell (i.e., the "to" cell) and a center of a cell that corresponds to the first time period that is entered in a non-anomalous cell, if the anomalous cell remains in a same state for consecutive time periods, the aircraft controller is configured to determine an absolute difference vector between a center of the anomalous cell to a center of a cell having a state that corresponds to a last anomalous cell the precursor to failure leg was in before entering the anomalous cell, otherwise, the aircraft controller determines an absolute difference vector between a center of a cell from which the precursor to failure leg transitioned from and a center of a cell to which the precursor to failure leg transitioned to, wherein, if a dimension of the absolute difference vector is above a predetermine number of standard deviations from a mean of a corresponding dimension of the absolute difference vectors for the one or more anomalous cell, the subject matter expert identified test variable corresponding to the dimension is flagged as indicating a fault.

A22. The aircraft fault detection system of paragraph A21, wherein the aircraft controller is configured to identify when the precursor to failure leg entered the anomalous cell and identify a period of time the precursor to failure leg remained in the anomalous cell.

B1. A method for aircraft fault detection, the method comprising:

capturing, with at least one aircraft data logging device, parametric flight data from at least one aircraft subsystem;

grouping, with an aircraft controller coupled to the data logging device, the parametric flight data from the at least one aircraft subsystem into a plurality of test states, one or more of the test states being different from other test states in the plurality of test states;

generating, with the aircraft controller, at least one test transition matrix based on the plurality of test states and determine anomalous behavior of the at least one aircraft subsystem based on the at least one test transition matrix; and forecasting, with the aircraft controller, faults within the at least one aircraft subsystem based on the anomalous behavior of the at least one aircraft subsystem determined from the at least one test transition matrix.

B2. The method of paragraph B1, wherein the at least one aircraft data logging device includes one or more of a flight data recorder, a quick access record, a continuous parameter logging system, and an enhanced airborne flight recorder.

B3. The method of paragraph B1, wherein the parametric fight data comprises a collection of time-series data collected during each flight leg of an aircraft flight.

B4. The method of paragraph B1, wherein the parametric flight data comprises training data that includes subject matter expert identified training variables for the at least one aircraft subsystem and a flight leg where a majority of maintenance messages for the at least one aircraft subsystem occur.

B5. The method of paragraph B4, further comprising:

accumulating, with the aircraft controller, the subject matter expert identified training variables into a matrix of training variables;

grouping, with the aircraft controller, the subject matter expert identified training variables into a plurality of training states and labeling each of the plurality of training states with a training state identification number;

labeling, with the aircraft controller, at least one time point in the matrix of training variables according to a corresponding training state identification number; and generating, with the aircraft controller, at least one training transition matrix for at least one flight leg of the training data.

B6. The method of paragraph B5, further comprising, where the training data is labeled data, training a machine learning model, with the aircraft controller, using the labeled data so that the machine learning model learns which of the at least one training transition matrix corresponds to normal aircraft subsystem operation and which of the at least one training transition matrix corresponds to faulty aircraft subsystem operation.

B7. The method of paragraph B6, wherein the labeled data identifies one or more of a flight leg that experienced a maintenance message and data in a flight leg that is indicative of a fault.

B8. The method of paragraph B5, wherein a number of the plurality of training states determines a number of the plurality of test states.

B9. The method of paragraph B5, further comprising, where the training data is not labeled or some of the at least one flight leg experienced a maintenance message, determining, with the aircraft controller, outlier training transition matrices from the at least one training transition matrix to identify a threshold distance.

B10. The method of paragraph B9, further comprising, determining, with the aircraft controller, the outlier training transition matrices by determining a training distance of one or more training transition matrix of the at least one training transition matrix to one or more other training transition matrix of the at least one training transition matrix, sorting the training distance for the one or more training transition matrix by order of magnitude, selecting a predetermined number of training distances having the greatest magnitude, and determining an average training distance for the predetermined number of training distances having the greatest magnitude.

B11. The method of paragraph B10, wherein the predetermined number of training distances is about 5.

B12. The method of paragraph B10, further comprising, where it is known which of the at least one flight leg experienced the maintenance message, determining, with the aircraft controller, using a receiver operating characteristic analysis and knowledge of which of the at least one flight leg experienced the maintenance message, which training distance is the threshold distance for a highest ratio of true positives to false positives within a predetermined time window.

B13. The method of paragraph B12, wherein the predetermined time window is about two weeks.

B14. The method of paragraph B10, wherein, where it is not known which of the at least one flight leg experienced a maintenance message, the threshold distance is about three standard deviations from the average training distance.

B15. The method of paragraph B1, wherein the parametric flight data comprises test data that includes subject matter expert identified test variables for the at least one aircraft subsystem and a flight leg where a majority of maintenance messages for the at least one aircraft subsystem occur.

B16. The method of paragraph B15, wherein the subject matter expert identified test variables correspond to subject matter expert identified training variables used to determine a threshold distance for determining the anomalous behavior.

B17. The method of paragraph B15, further comprising generating, with the aircraft controller, the at least one test transition matrix by accumulating the subject matter expert identified test variables into a matrix of test variables, labeling each of the plurality of test states with a test state identification number, and labeling at least one time point in the matrix of test variables according to a corresponding test state identification number.

B18. The method of paragraph B15, further comprising, with the aircraft controller, determining the anomalous behavior by applying a trained machine learning model to the at least one test transition matrix.

B19. The method of paragraph B15, further comprising, with the aircraft controller, determining the anomalous behavior for at least one flight leg by determining a test distance of one or more test transition matrix for a respective one of the at least one flight leg to one or more other test transition matrix of the respective one of the at least one flight leg, sorting the test distance for the one or more test transition matrix, of the respective one of the at least one flight leg, by order of magnitude, selecting a predetermined number of test distances, of the respective one of the at least one flight leg, having the greatest magnitude, determining an average test distance for the predetermined number of distances, of the respective one of the at least one flight leg, having the greatest magnitude, and comparing the average test distance to a threshold distance and labeling the respective one of the at least one flight leg as a precursor to failure leg where the average test distance exceeds the threshold distance.

B20. The method of paragraph B18 or B19, further comprising, for one or more precursor to failure leg, identifying, with the aircraft controller, the subject matter expert identified test variables and a respective time within the respective one of the at least one flight leg the subject matter expert identified test variable was anomalous.

B21. The method of paragraph B20, wherein identifying the subject matter expert identified test variables and the respective time within the respective one of the at least one flight leg the subject matter expert identified test variable was anomalous including identifying anomalous cells within one or more transition matrix in the precursor to failure leg, where an anomalous cell is a cell that is more than two standard deviations from a normal cell of the same type within the precursor to failure leg, for one or more anomalous cell if the anomalous cell corresponds to a first time period of a phase of the at least one flight leg, the aircraft controller is configured to determine an absolute difference vector between a center of a next state cell (i.e., the "to" cell) and a center of a cell that corresponds to the first time period that is entered in a non-anomalous cell, if the anomalous cell remains in a same state for consecutive time periods, the aircraft controller is configured to determine an absolute difference vector between a center of the anomalous cell to a center of a cell having a state that corresponds to a last anomalous cell the precursor to failure leg was in before entering the anomalous cell, otherwise, the aircraft controller determines an absolute difference vector between a center of a cell from which the precursor to failure leg transitioned from and a center of a cell to which the precursor to failure leg transitioned to, wherein, if a dimension of the absolute difference vector is above a predetermine number of standard deviations from a mean of a corresponding dimension of the absolute difference vectors for the one or more anomalous cell, the subject matter expert identified test variable corresponding to the dimension is flagged as indicating a fault.

B22. The method of paragraph B21, further comprising identifying, with the aircraft controller, when the precursor to failure leg entered the anomalous cell and identifying a period of time the precursor to failure leg remained in the anomalous cell.

B23. The method of paragraph B22, further comprising presenting, on a user interface coupled to the aircraft controller, the subject matter expert identified test variable corresponding to the dimension is flagged as indicating a fault and the period of time the precursor to failure leg remained in the anomalous cell.

C1. A method for aircraft fault detection, the method comprising:

capturing, with at least one aircraft data logging device, parametric flight data from at least one aircraft subsystem; and forecasting, with an aircraft controller, faults within the at least one aircraft subsystem based on anomalous behavior of the at least one aircraft subsystem determined from at least one test transition matrix;

wherein the at least one test transition matrix is generated with the aircraft controller by grouping the parametric flight data from the at least one aircraft subsystem into a plurality of test states, where one or more of the test states is different from other test states in the plurality of states, for more than one time point in the parametric flight data, identifying a current state of a subject matter expert identified test variable of the parametric flight data and counting a frequency the subject matter expert identified test variable transitions from the current state to another state or to a same state (i.e., remains at the current state) at a next sequential time point, and normalizing the frequency so that one or more entry in a respective cell of a respective test transition matrix is a probability number that lies between zero and one.

C2. The method of paragraph C1, wherein the at least one aircraft data logging device includes one or more of a flight data recorder, a quick access record, a continuous parameter logging system, and an enhanced airborne flight recorder.

C3. The method of paragraph C1, wherein the parametric fight data comprises a collection of time-series data collected during each flight leg of an aircraft flight.

C4. The method of paragraph C1, wherein the parametric flight data comprises training data that includes subject matter expert identified training variables for the at least one aircraft subsystem and a flight leg where a majority of maintenance messages for the at least one aircraft subsystem occur.

C5. The method of paragraph C1, further comprising:

accumulating, with the aircraft controller, the subject matter expert identified training variables into a matrix of training variables;

grouping, with the aircraft controller, the subject matter expert identified training variables into a plurality of training states and labeling each of the plurality of training states with a training state identification number;

labeling, with the aircraft controller, at least one time point in the matrix of training variables according to a corresponding training state identification number; and generating, with the aircraft controller, at least one training transition matrix for at least one flight leg of the training data.

C6. The method of paragraph C5, further comprising, where the training data is labeled data, training a machine learning model, with the aircraft controller, using the labeled data so that the machine learning model learns which of the at least one training transition matrix corresponds to normal aircraft subsystem operation and which of the at least one training transition matrix corresponds to faulty aircraft subsystem operation.

C7. The method of paragraph C6, wherein the labeled data identifies one or more of a flight leg that experienced a maintenance message and data in a flight leg that is indicative of a fault.

C8. The method of paragraph C5, wherein a number of the plurality of training states determines a number of the plurality of test states.

C9. The method of paragraph C5, further comprising, where the training data is not labeled or some of the at least one flight leg experienced a maintenance message, determining, with the aircraft controller, outlier training transition matrices from the at least one training transition matrix to identify a threshold distance.

C10. The method of paragraph C9, further comprising, determining, with the aircraft controller, the outlier training transition matrices by determining a training distance of one or more training transition matrix of the at least one training transition matrix to one or more other training transition matrix of the at least one training transition matrix, sorting the training distance for the one or more training transition matrix by order of magnitude, selecting a predetermined number of training distances having the greatest magnitude, and determining an average training distance for the predetermined number of training distances having the greatest magnitude.

C11. The method of paragraph C10, wherein the predetermined number of training distances is about 5.

C12. The method of paragraph C10, further comprising, where it is known which of the at least one flight leg experienced the maintenance message, determining, with the aircraft controller, using a receiver operating characteristic analysis and the knowledge of which of the at least one flight leg experienced the maintenance message, which training distance is the threshold distance for a highest ratio of true positives to false positives within a predetermined time window.

C13. The method of paragraph C12, wherein the predetermined time window is about two weeks.

C14. The method of paragraph C10, wherein, where it is not known which of the at least one flight leg experienced a maintenance message, the threshold distance is about three standard deviations from the average training distance.

C15. The method of paragraph C1, wherein the parametric flight data comprises test data that includes subject matter expert identified test variables for the at least one aircraft subsystem and a flight leg where a majority of maintenance messages for the at least one aircraft subsystem occur.

C16. The method of paragraph C15, wherein the subject matter expert identified test variables correspond to subject matter expert identified training variables used to determine a threshold distance for determining the anomalous behavior.

C17. The method of paragraph C15, generating the at least one test transition matrix further includes accumulating the subject matter expert identified test variables into a matrix of test variables, labeling each of the plurality of test states with a test state identification number, and labeling more than one time point in the matrix of test variables according to a corresponding test state identification number.

C18. The method of paragraph C15, further comprising, with the aircraft controller, determining the anomalous behavior by applying a trained machine learning model to the at least one test transition matrix.

C19. The method of paragraph C15, further comprising, with the aircraft controller, determining the anomalous behavior for at least one flight leg by determining a test distance of one or more test transition matrix for a respective one of the at least one flight leg to one or more other test transition matrix of the respective one of the at least one flight leg, sorting the test distance for the one or more test transition matrix, of the respective one of the at least one flight leg, by order of magnitude, selecting a predetermined number of test distances, of the respective one of the at least one flight leg, having the greatest magnitude, determining an average test distance for the predetermined number of test distances, of the respective one of the at least one flight leg, having the greatest magnitude, and comparing the average test distance to a threshold distance and labeling the respective one of the at least one flight leg as a precursor to failure leg where the average test distance exceeds the threshold distance.

C20. The method of paragraph C18 or C19, further comprising, for one or more precursor to failure leg, identifying, with the aircraft controller, the subject matter expert identified test variables and a respective time within the respective one of the at least one flight leg the subject matter expert identified test variable was anomalous.

C21. The method of paragraph C20, wherein identifying the subject matter expert identified test variables and the respective time within the respective one of the at least one flight leg the subject matter expert identified test variable was anomalous includes identifying anomalous cells within one or more transition matrix in the precursor to failure leg, where an anomalous cell is a cell that is more than two standard deviations from a normal cell of the same type within the precursor to failure leg, for one or more anomalous cell if the anomalous cell corresponds to a first time period of a phase of the at least one flight leg, the aircraft controller is configured to determine an absolute difference vector between a center of a next state cell (i.e., the "to" cell) and a center of a cell that corresponds to the first time period that is entered in a non-anomalous cell, if the anomalous cell remains in a same state for consecutive time periods, the aircraft controller is configured to determine an absolute difference vector between a center of the anomalous cell to a center of a cell having a state that corresponds to a last anomalous cell the precursor to failure leg was in before entering the anomalous cell, otherwise, the aircraft controller determines an absolute difference vector between a center of a cell from which the precursor to failure leg transitioned from and a center of a cell to which the precursor to failure leg transitioned to, wherein, if a dimension of the absolute difference vector is above a predetermine number of standard deviations from a mean of a corresponding dimension of the absolute difference vectors for the one or more anomalous cell, the subject matter expert identified test variable corresponding to the dimension is flagged as indicating a fault.

C22. The method of paragraph C21, further comprising identifying, with the aircraft controller, when the precursor to failure leg entered the anomalous cell and identifying a period of time the precursor to failure leg remained in the anomalous cell.

C23. The method of paragraph C22, further comprising presenting, on a user interface coupled to the aircraft controller, the subject matter expert identified test variable corresponding to the dimension is flagged as indicating a fault and the period of time the precursor to failure leg remained in the anomalous cell.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 2, 3, and 8, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 2, 3, and 8 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An aircraft fault detection system, comprising:
   at least one aircraft data logging device configured to capture a collection of time-series flight data, from at least one aircraft subsystem, for at least one flight leg of an aircraft flight; and
   an aircraft controller coupled to the at least one aircraft data logging device, the aircraft controller being configured to
   group the collections of time-series flight data from the at least one aircraft subsystem into a plurality of test states, the plurality of test states being determined from a plurality of training states and one or more of the test states is different from other test states in the plurality of test states,
   generate at least one test transition matrix based on the plurality of test states and determine anomalous behavior of the at least one aircraft subsystem based on the at least one test transition matrix, and
   forecast a fault within the at least one aircraft subsystem based on the anomalous behavior of the at least one aircraft subsystem determined from the at least one test transition matrix.

2. The aircraft fault detection system of claim 1, wherein the collection of time-series flight data comprises training data that includes subject matter expert identified training variables for the at least one aircraft subsystem and the at least one flight leg where a majority of maintenance messages for the at least one aircraft subsystem occur.

3. The aircraft fault detection system of claim 2, wherein the aircraft controller is configured to:
   accumulate the subject matter expert identified training variables into a matrix of training variables;
   group the subject matter expert identified training variables into a plurality of training states and label each of the plurality of training states with a training state identification number;
   label at least one time point in the matrix of training variables according to a corresponding training state identification number; and
   generate at least one training transition matrix for one or more of the at least one flight leg of the training data.

4. The aircraft fault detection system of claim 3, wherein the aircraft controller is configured to, where the training data is labeled data, train a machine learning model using the labeled data so that the machine learning model learns which of the at least one training transition matrix corresponds to normal aircraft subsystem operation and which of the at least one training transition matrix corresponds to faulty aircraft subsystem operation.

5. The aircraft fault detection system of claim 4, wherein the labeled data identifies one or more of a flight leg, of the at least one flight leg, that experienced a maintenance message and data in a flight leg, of the at least one flight leg, that is indicative of the fault.

6. The aircraft fault detection system of claim 3, wherein the aircraft controller is configured to, where the training data is not labeled or some of the at least one flight leg experienced a maintenance message, determine outlier training transition matrices from the at least one training transition matrix to identify a threshold distance.

7. The aircraft fault detection system of claim 1, wherein the collection of time-series flight data comprises test data that comprises subject matter expert identified test variables for the at least one aircraft subsystem and a flight leg, of the at least one flight leg, where a majority of maintenance messages for the at least one aircraft subsystem occur.

8. The aircraft fault detection system of claim 7, wherein the subject matter expert identified test variables correspond to subject matter expert identified training variables used to determine a threshold distance for determining the anomalous behavior.

9. A method, comprises:
   receiving, by an aircraft controller, information captured by at least one aircraft data logging device, wherein the information comprises a collection of time-series flight data, from at least one aircraft subsystem, for at least one flight leg of an aircraft flight;
   grouping, by the aircraft controller, the collections of time-series flight data from the at least one aircraft subsystem into a plurality of test states, the plurality of test states being determined from a plurality of training states and one or more of the test states being different from other test states in the plurality of test states;

generating, by the aircraft controller, at least one test transition matrix based on the plurality of test states and determine anomalous behavior of the at least one aircraft subsystem based on the at least one test transition matrix; and forecasting, by the aircraft controller, a fault within the at least one aircraft subsystem based on the anomalous behavior of the at least one aircraft subsystem determined from the at least one test transition matrix.

10. The method of claim 9, wherein the collection of time-series flight data comprises training data that includes subject matter expert identified training variables for the at least one aircraft subsystem and a flight leg of the at least one flight leg where a majority of maintenance messages for the at least one aircraft subsystem occur.

11. The method of claim 9, wherein the collection of time-series flight data comprises test data that comprises subject matter expert identified test variables for the at least one aircraft subsystem and a flight leg of the at least one flight leg where a majority of maintenance messages for the at least one aircraft subsystem occur.

12. The method of claim 11, further comprising determining, with the aircraft controller, the anomalous behavior by applying a trained machine learning model to the at least one test transition matrix.

13. The method of claim 11, further comprising determining, with the aircraft controller, the anomalous behavior for the at least one flight leg by
    determining a test distance of one or more test transition matrix for a respective one of the at least one flight leg to one or more other test transition matrix of the respective one of the at least one flight leg,
    sorting the test distance for the one or more test transition matrix, of the respective one of the at least one flight leg, by order of magnitude,
    selecting a predetermined number of test distances, of the respective one of the at least one flight leg, having the greatest magnitude,
    determining an average test distance for the predetermined number of test distances, of the respective one of the at least one flight leg, having the greatest magnitude, and
    comparing the average test distance to a threshold distance and labeling the respective one of the at least one flight leg as a precursor to failure leg where the average test distance exceeds the threshold distance.

14. The method of claim 13, further comprising, for each precursor to failure leg, identifying, with the aircraft controller, the subject matter expert identified test variables and a respective time within the respective one of the at least one flight leg the subject matter expert identified test variable was anomalous.

15. A method, comprising:
    capturing, with at least one aircraft data logging device, a collection of time-series flight data, from at least one aircraft subsystem, for at least one flight leg of an aircraft flight; and
    forecasting, with an aircraft controller, faults within the at least one aircraft subsystem based on anomalous behavior of the at least one aircraft subsystem determined from at least one test transition matrix,
    wherein the at least one test transition matrix is generated with the aircraft controller by
        grouping the collections of time-series flight data from the at least one aircraft subsystem into a plurality of test states, the plurality of test states being determined from a plurality of training states where one or more of the test states is different from other test states in the plurality of test states,
        for more than one time point in the collections of time-series flight data, identifying a current state of a subject matter expert identified test variable of the collections of time-series flight data and counting a frequency of the subject matter expert identified test variable transitions from the current state to another state or to a same state at a next sequential time point, and
        normalizing the frequency so that one or more entry in a respective cell of a respective test transition matrix is a probability number that lies between zero and one.

16. The method of claim 15, wherein the collection of time-series of flight data comprises test data that includes subject matter expert identified test variables for the at least one aircraft subsystem and a flight leg, of the at least one flight leg, where a majority of maintenance messages for the at least one aircraft subsystem occur.

17. The method of claim 16, further comprising, with the aircraft controller, determining the anomalous behavior by applying a trained machine learning model to the at least one test transition matrix.

18. The method of claim 17, further comprising, for one or more precursor to failure leg, identifying, with the aircraft controller, the subject matter expert identified test variables and a respective time within a respective flight leg the subject matter expert identified test variable was anomalous.

19. The method of claim 18, wherein identifying the subject matter expert identified test variables and the respective time within the respective flight leg the subject matter expert identified test variable was anomalous includes:
    identifying anomalous cells within one or more transition matrix in the precursor to failure leg, where an anomalous cell is a cell that is more than two standard deviations from a normal cell of the same type within the precursor to failure leg; and
    for one or more anomalous cell:
        if the anomalous cell corresponds to a first time period of a phase of the flight leg, the aircraft controller is configured to determine a first absolute difference vector between a center of a next state cell and a center of a first cell that corresponds to the first time period that is entered in a non-anomalous cell,
        if the anomalous cell remains in a same state for consecutive time periods, the aircraft controller is configured to determine a second absolute difference vector between a center of the anomalous cell to a center of a second cell having a state that corresponds to a last anomalous cell the precursor to failure leg was in before entering the anomalous cell,
        otherwise, the aircraft controller determines a third absolute difference vector between a center of a third cell from which the precursor to failure leg transitioned from and a center of a fourth cell to which the precursor to failure leg transitioned to, and
    wherein, if a dimension of the first absolute difference vector, the second absolute difference vector, or the third absolute difference vector is above a predetermined number of standard deviations from a mean of a corresponding dimension of the first absolute difference vector, the second absolute difference vector, or the third absolute difference vector for the one or more anomalous cell, the subject matter expert identified test variable corresponding to the dimension is flagged as indicating a fault.

20. The method of claim 19, further comprising:

identifying, with the aircraft controller, when the precursor to failure leg entered the anomalous cell and identifying a period of time the precursor to failure leg remained in the anomalous cell; and presenting, on a user interface coupled to the aircraft controller, the subject matter expert identified test variable corresponding to the dimension is flagged as indicating the fault and the period of time the precursor to failure leg remained in the anomalous cell.

* * * * *